US008029889B1

(12) United States Patent
Li et al.

(10) Patent No.: US 8,029,889 B1
(45) Date of Patent: *Oct. 4, 2011

(54) PREPREGS, TOWPREGS AND PREFORMS

(75) Inventors: Wei Helen Li, San Ramon, CA (US);
Stanley L. Lehmann, Martinez, CA (US); Raymond S. Wong, San Ramon, CA (US)

(73) Assignee: Henkel Corporation, Rocky Hill, CT (US)

(*) Notice: Subject to any disclaimer, the term of this patent is extended or adjusted under 35 U.S.C. 154(b) by 58 days.

This patent is subject to a terminal disclaimer.

(21) Appl. No.: 12/542,825

(22) Filed: Aug. 18, 2009

Related U.S. Application Data

(63) Continuation-in-part of application No. 11/004,566, filed on Dec. 3, 2004, now Pat. No. 7,666,938, which is a continuation-in-part of application No. 11/291,850, filed on Dec. 2, 2005, now Pat. No. 7,649,060.

(51) Int. Cl.
| | |
|---|---|
| *D04H 3/00* | (2006.01) |
| *D04H 5/00* | (2006.01) |
| *D04H 13/00* | (2006.01) |
| *B32B 25/02* | (2006.01) |
| *B32B 25/10* | (2006.01) |
| *B32B 37/00* | (2006.01) |
| *B29C 70/44* | (2006.01) |

(52) U.S. Cl. .................. 428/292.1; 428/297.1; 264/258
(58) Field of Classification Search .............. 428/292.1, 428/297.1; 264/258
See application file for complete search history.

(56) References Cited

U.S. PATENT DOCUMENTS

| | | | | |
|---|---|---|---|---|
| 3,442,974 | A | 5/1969 | Bremmer | 260/831 |
| 4,419,496 | A | 12/1983 | Henton et al. | 525/301 |
| 4,423,201 | A | 12/1983 | Hicks | 528/76 |
| 4,607,091 | A | 8/1986 | Schreiber | 528/96 |
| 4,659,779 | A | 4/1987 | Bagga et al. | 525/118 |
| 4,778,851 | A | 10/1988 | Henton et al. | 525/65 |
| 4,806,267 | A | 2/1989 | Culbertson et al. | 252/182.23 |
| 5,021,484 | A | 6/1991 | Schreiber et al. | 524/100 |
| 5,200,452 | A | 4/1993 | Schreiber | 524/398 |
| 5,278,257 | A | 1/1994 | Mülhaupt et al. | 525/454 |
| 5,281,388 | A | 1/1994 | Palmer et al. | 264/571 |
| 5,315,462 | A | 5/1994 | Ohkubo et al. | 360/96.5 |
| 5,369,192 | A | 11/1994 | Ko et al. | 525/484 |
| 5,439,635 | A | 8/1995 | Seemann | 264/510 |
| 5,443,911 | A | 8/1995 | Schreiber et al. | 428/413 |
| 5,445,911 | A | 8/1995 | Russell et al. | 430/115 |
| 5,480,603 | A | 1/1996 | Lopez et al. | 264/131 |
| 5,543,516 | A | 8/1996 | Ishida | 544/69 |
| 5,567,499 | A | 10/1996 | Cundiff et al. | 428/116 |
| 5,677,048 | A | 10/1997 | Pushaw | 428/320.2 |
| 5,728,755 | A | 3/1998 | Weigel et al. | 523/457 |
| 5,851,336 | A | 12/1998 | Cundiff et al. | 156/272.2 |
| 5,902,535 | A | 5/1999 | Burgess et al. | 264/257 |
| 5,955,566 | A | 9/1999 | Lee et al. | 528/310 |
| 5,981,659 | A | 11/1999 | Geck et al. | 525/100 |
| 6,111,015 | A | 8/2000 | Eldin et al. | 525/65 |
| 6,147,142 | A | 11/2000 | Geck et al. | 523/231 |
| 6,180,693 | B1 | 1/2001 | Tang et al. | 523/231 |
| 6,207,786 | B1 | 3/2001 | Ishida et al. | 528/94 |
| 6,313,248 | B1 | 11/2001 | Boyd et al. | 526/262 |
| 6,323,270 | B1 | 11/2001 | Ishida | 524/445 |
| 6,376,080 | B1 | 4/2002 | Gallo | 428/413 |
| 6,429,157 | B1 | 8/2002 | Kishi et al. | 442/227 |
| 6,534,179 | B2 | 3/2003 | Japp et al. | 428/413 |
| 6,620,905 | B1 | 9/2003 | Musa | 528/423 |
| 6,620,925 | B1 | 9/2003 | Noteborn | 536/235 |
| 6,632,511 | B2 | 10/2003 | Zhang | 428/209 |
| 6,693,143 | B2 | 2/2004 | Pflug | 526/116 |
| 6,743,852 | B2 | 6/2004 | Dershem et al. | 524/548 |
| 6,776,869 | B1 | 8/2004 | Schenkel | 156/331.7 |
| 6,982,236 | B2 | 1/2006 | Wenzel et al. | 502/117 |
| 7,053,138 | B2 | 5/2006 | Magendie et al. | 523/451 |
| 7,537,827 | B1 * | 5/2009 | Lehmann et al. | 428/297.1 |
| 7,649,060 | B2 * | 1/2010 | Li et al. | 525/526 |
| 2003/0018131 | A1 | 1/2003 | Davis et al. | 525/107 |
| 2003/0023007 | A1 | 1/2003 | Reardon | 525/430 |
| 2003/0196753 | A1 | 10/2003 | Schoenfeld et al. | 156/330 |
| 2004/0170554 | A1 | 9/2004 | Wadahara et al. | 423/447.2 |
| 2004/0216838 | A1 | 11/2004 | Ekman et al. | 156/307.3 |
| 2005/0032935 | A1 | 2/2005 | Salvin et al. | 522/110 |
| 2005/0032946 | A1 | 2/2005 | Salvin et al. | 524/186 |
| 2005/0070634 | A1 | 3/2005 | Lutz et al. | 525/111 |
| 2006/0035548 | A1 | 2/2006 | Goto | 442/181 |
| 2007/0027233 | A1 | 2/2007 | Yamaguchi | |
| 2007/0129509 | A1 | 6/2007 | Li et al. | 525/526 |

FOREIGN PATENT DOCUMENTS

CN      9411852.5      10/2000

(Continued)

OTHER PUBLICATIONS

H. Kim, H. Ishida, "Study on the Chemical Stability of Benzoxazine-Based Phenolic Resins in Carboxylic Acids", J. Appl. Polym. Sci., vol. 79, pp. 1207-1219 (2001). H. Ishida, D. J. Allen, "Gelation Behavior of Near-Zero Shrinkage Polybenzoxazines", J. Appl. Polym. Sci., vol. 79, 406-417 (2001).
H. Ishida, D.P. Sanders, "Improved Thermal and Mechanical Properties of Polybenzoxazines Based on Alkyl-Substituted Aromatic Amines", J. Polym. Sci.: Part B, vol. 38, pp. 3289-3301 (2000).
H, Ishida, D.P.Sanders, "Regioselectivity and Network Structure of Difunctional Alkyl-Substituted Aromatic Amine-Based Polybenzoxazines", Macromolecules, 33, 8149-8157 (2000).
N. Dansiri, et al., "Resin Transfer Molding of Natural Fiber Reinforced Polybenzoxazine Composities", J. Soc. of Plast. Engs., 23(3), 352-360, (2002).
Y. Gu, et al., "New Matrix based on Benzoxazine for Resin Transfer Molding (RTM) and their Composites", *Fuhe Cailiao Xuebao*, 17(4), 32-37 (2000) (Abstract).
J. Jang, et al. "Toughness Improvement of Carbon-Fibre/Polybenzoxazine Composites by Rubber Modification", *Composites Sci. and Tech.*, 60, 3, 457-463 (2000)(Abstract).

(Continued)

*Primary Examiner* — Nathan M Nutter
(74) *Attorney, Agent, or Firm* — Steven C. Bauman

(57) ABSTRACT

The present invention relates to prepregs, towpregs and preforms made from curable compositions of (a) benzoxazines, (b) a combination of adducts a first of which is prepared from hydroxy-containing compounds, isocyanate-containing compounds and phenolic compounds and the second of which is prepared from the first adduct and epoxy-containing compounds, (c) components reactive with the benzoxazine, such as epoxy resins, episulfide resins and oxetane resins, (d) tougheners, such as polyether sulfones, ATBN and core shell materials and (e) a silica component, where the silica has a mean particle diameter on the order of $10^{-9}$ meters.

36 Claims, 1 Drawing Sheet

FOREIGN PATENT DOCUMENTS

| | | |
|---|---|---|
| EP | 0 518 060 A2 | 5/1992 |
| EP | 0 323 142 B1 | 9/1993 |
| EP | 1 408 152 | 1/2004 |
| EP | 1 415 782 | 6/2004 |
| EP | 1 541 312 | 6/2005 |
| EP | 1 647 576 | 4/2006 |
| EP | 1 734 069 | 12/2006 |
| JP | 06 345898 | 12/1994 |
| JP | 10 3010678 | 11/1998 |
| JP | 1259830 | 6/1999 |
| JP | 2000 273291 | 10/2000 |
| JP | 2001/278934 | 10/2001 |
| JP | 2002/302486 | 10/2002 |
| JP | 2003 082117 | 3/2003 |
| JP | 2004/182851 | 7/2004 |
| JP | 2004/352670 | 12/2004 |
| WO | WO 03/013820 | 2/2003 |
| WO | WO 03/018674 | 2/2003 |
| WO | WO 03/072638 | 9/2003 |
| WO | WO 2004/108825 | 12/2004 |
| WO | WO 2005/000955 | 1/2005 |
| WO | WO 2005/007766 | 1/2005 |

OTHER PUBLICATIONS

S. B. Shen and H. Ishida, "Dynamic Mechanical and Thermal Characterization of High-Performance Polybenzoxazines", J. Polym. Sci.: Part B Polym. Phy., vol. 37, 3257-3268 (1999).

S. Rimdusit and H. Ishida, "Synergism and Multiple Mechanical Relaxations Observed in Ternary Systems Based on Benzoxazine, Epoxy, and Phenlic Resins", J. Polym. Sci: Part B: Polym. Phy., vol. 38, 1687-1698 (2000).

J. Dunkers, H. Ishida, "Reaction of Benzoxazine-based Phenolic Resins with Strong and Weak carbonxylic Acids and Phenols as Catalysts", J. Polym. Sci.: Part A: Polym. Chem., vol. 37, 1913-1921 (1999).

X. Zhang, A. C. Potter and D. H. Solomon, "The Chemistry of Novolac Resins—V. Reactions of Benzoxazine Intermediates", Polymer, vol. 39, 399-404 (1998).

X. Zhang and D. H. Solomon, "The Chemistry of Novolac Resins—VI. Reactions Between Benzoxazine Intermediates and Model Phenols", Polymer, vol. 39, No. 2, pp. 405-412 (1998).

Y. Wang and H. Ishida, "Development of Low-Viscosity Benzoxazine Resins and Their Polymers", J. Appl. Polym. Sci., vol. 86, pp. 2953-2966 (2002).

K. Hemvichian and H. Ishida, Thermal Decomposition Processes in Aromatic Amine-Based Polybenzoxazines Investigated by TGA and GC-MS, Polymer, vol. 43, pp. 4391-4402 (2002).

B.M. Culbertson, "Cyclic Imino Ethers in Step-Growth Polymerizations", Prog. Polym. Sci., Article in Press (2001).

H. Kimura, S. Taguchi, A. Matsumoto, "Studies on New Type of Phenolic Resin (IX) Curing Reaction of Bisphenol A-Based Benzoxazine with Bisoxazoline and the Properties of the Cured Resin. II. Cure Reactivity of Benzoxazine", J. Appl. Polym. Sci., vol. 79, 2331-2339 (2001).

P. Chutayothin, H. Ishida, and S. Rowan, "Cationic Ring-Opening Polymerization of Monofunctional Benzoxazine", Polymer Reprints, 42(2), pp. 599-600,621-622 (2001).

T. Agag and T. Takeichi, "Novel Benzoxazine Monomers Containing p-Phenyl Propargyl Ether: Polymerization of Monomers and Properties of Polybenzoxazines", Macromolecules, 34, pp. 7257-7263 (2001).

H. Kimura, et al., "New Thermosetting Resin from Poly(p-vinylphenol) Based Benzoxazine and Epoly Resin", J. Appl. Polym. Sci, vol. 79, 555-565 (2001).

A. S. C. Lim, et al., "Chemistry of Novolac Resins. X. Polymerization Studies of HMTA and Strategically Synthesized Model Compounds", J. of Polym. Sci.: Part A: Polym. Chem., vol. 37, 1347-1355 (1999).

H. Y. Low and H. Ishida, "Mechanistic Study on the Thermal Decomposition of Polybenzoxazines: Effects of Aliphatic Amines", J. of Polym. Sci.: Part B: Polym. Phy., vol. 36, pp. 1935-1946 (1998).

H. Kimura, et al., "Epoxy Resin Cured by Bisphenol A. Based Benzoxazine", J. of Appl. Polym. Sci., vol. 68, 1903-1910 (1998).

S. Rimdusit and H. Ishida, "Development of New Class of Electronic Packaging Materials Based on Ternary System of Benzoxazine, Epoxy, and Phenolic Resis," Polymer, 41, 7491-49 (2000)

H. Ishida and D. Allen, "Mechanical Characterization of Copolymers based on Benzoxazine and Epoxy", Polymer, vol. 37, No. 20, pp. 4487-4495 (1996).

H. Ishida and Y. Rodriguez, "Curing Kinetics of a New Benzoxazine-Based Phenolic Resin by Differential Scanning Calorimetry", Polymer, vol. 36, No. 16, pp. 3151-3158 (1995).

H. Kim and H. Ishida, "A Study on Hydrogen-Bonded Network Structure of Polybenzoxazines" J. Phys. Chem. A 106, pp. 3271-3280 (2002).

X. Liu and Y. Gu, "Study on the Volumetric Expansion of Benzoxazine Curing with Different Catalysts", J. Appl. Sci., vol. 84, pp. 1107-1113 (2001).

S. Rimdusit and H. Ishida, "Gelation Study of High Processability and High Reliability Ternary Systems based on Benzoxazine, Epoxy, and Phenolic Resins for an Application as Eletronic Packaging Materials", Rheol Acta 41, pp. 1-9 (2002).

J. E. McGrath, et al., "Syntheses and Characterizatio of Segmented Polyimide-Polyorganosiloxane Copolymers", Adv. in Polym. Sci., vol. 140, pp. 61-105 (1999).

ULTEM 2000 (CAS Reg. No. 61128-46-9) (2003).

W. J. Burke, et al., "A new Aminoalkylation Reation. Condensation of Phenols with Dihydro-1, 3-Aroxazines", J. Org. Chem., vol. 30(10), pp. 3423-3427 (1965).

J. Jang and D. Seo, "Performance Improvement of Rubber-Modified Polybenzoxazine", J. Appl. Polym. Sci., vol. 67, pp. 1-10 (1998).

Raymond A. Pearson, "Toughening Epoxies Using Rigid Thermoplastic Particles", American Chemical Society, pp. 405-425 (1993).

T. Takeichi, et al, "Synthesis and Properties of Polybenzoxazine Based Composites", Recent Res. Devel. Polymer Science, 4, 85-105 (2000).

Hajime Kimura, et al., "New Thermosetting Resin from Bisphenol A-Based Benzoxazine and Bisoxazoline", J. Appl. Polym. Sci., vol. 72, pp. 1551-1558 (1999).

Y.-X. Wang, H. Ishida, "Catonic Ring-Opening Polymerization of Benzoxazines", Polymer 40, pp. 4563-4570 (1999).

Y. Cui et al., "Synthesis and Characterization of Polyurethane/Polybenzoxazine-Based Interpenetrating Polymer Networks (IPNs)", School of Chemistry and Chemical Technology, Polymer International, 52, pp. 1246-1248 (2003).

T. Takeichi et al., "Synthesis and Characterization of Poly(urethane-benzoxazine) Films as Novel Type of Polyurethane/Phenolic Resin Composites", School of Material Science, Toyohashi University of Technology, pp. 4165-4176 (2000).

Standard Test Methods for Density and Specific Gravity (Relative Density) of Plastics by Displacement, American Society for Testing Materials, ASTM D 792-00, pp. 1-6 (Mar. 2001).

Standard Test Methods for Plane-Strain Fracture Toughness and Strain Energy Release Rate of Plastic Materials, American Society for Testing and Materials, ASTM D5045-96, pp. 1-9 (Sep. 1996).

Lee, Y.-J. et al., "Syntheses, Thermal Property, and Phase Morphologies of Novel Benzoxazines Functionalized With Polyhedral Oligomeric Silsesquioxane (POSS) Nanocomposites", Polym. Elsevier Sci. Publishers B.V., GB, vol. 45, No. 18, pp. 6321-6631 (Aug. 19, 2004).

* cited by examiner

PREPREGS, TOWPREGS AND PREFORMS

RELATED U.S. APPLICATION DATA

This application continues in part from U.S. patent application Ser. No. 11/004,566, filed Dec. 3, 2004 and U.S. patent application Ser. No. 11/291,850, filed Dec. 2, 2005, the disclosures of each of which hereby being expressly incorporated herein by reference.

BACKGROUND

1. Field

The present invention relates to prepregs, towpregs and preforms made from curable compositions of (a) benzoxazines, (b) a combination of adducts a first of which is prepared from hydroxy-containing compounds, isocyanate-containing compounds and phenolic compounds and the second of which is prepared from the first adduct and epoxy-containing compounds, (c) components reactive with the benzoxazine, such as epoxy resins, episulfide resin and oxetane resins, (d) tougheners, such as polyether sulfones, and (e) a silica component, where the silica has a mean particle diameter on the order of $10^{-9}$ meters.

2. Brief Description of Related Technology

Epoxy resins with various hardeners have been used extensively in the aerospace industry both as adhesives and as matrix resins for use in prepreg assembly with a variety of substrates.

Mixtures of epoxy resins and phenol-capped polyurethanes are known. Polyurethanes are obtained ordinarily by reacting isocyanates with hydroxy-containing compounds; the resulting polyurethane products should no longer contain free, phenolic hydroxyl groups. Such polyurethane products may be combined with epoxy resins and amine curing agents to give curable coating agents reportedly distinguished by improved elasticity. For instance, see U.S. Pat. Nos. 4,423,201 and 3,442,974.

Epoxy resins can also be mixed with copolymers based on butadiene and acrylonitrile to enhance the impact strength and/or the flexibility of the cured product. Ordinarily, however, such copolymers ordinarily compromise the tensile shear strength and the glass transition temperature of the resulting cured products.

U.S. Pat. No. 5,278,257 (Mulhaupt) refers to and claims a composition containing a copolymer based on at least one 1,3-diene and at least one polar, ethylenically unsaturated comonomer, a phenol-terminated polyurethane, polyurea or polyurea-urethane of a certain formula, after the removal of the terminal isocyanate, amino or hydroxyl groups, which is soluble or dispersible in epoxy resins, it being necessary for at least one of these groups to be a tertiary amine and where the ratio by weight of the comonomer to the polyurethane, polyurea or polyurea-urethane is from 5:1 to 1:5, and an epoxy resin having at least two 1,2-epoxide groups per molecule.

U.S. Patent Application Publication No. 2005/0070634 describes a composition comprising a) one or more epoxy resins; b) one or more rubber modified epoxy resins; c) one or more toughening compositions comprising the reaction product of one or more isocyanate terminated prepolymers and one or more capping compounds having one or more bisphenolic, phenolic, benzyl alcohol, aminophenyl or, benzylamino moieties where the reaction product is terminated with the capping compound; d) one or more curing agents and one or more catalysts for epoxy resins which initiates cure at a temperature of about 100° C. or greater; and e) optionally, fillers, adhesion promoters, wetting agents and rheological additives useful in epoxy adhesive compositions. The resulting adhesive composition is reported to have a viscosity at 45° C. of about 20 Pa·s to about 400 Pa·s.

Benzoxazines have been reported in the literature as generally electrical properties (e.g., dielectric constant), and low flammability.

U.S. Pat. No. 6,323,270 (Ishida) speaks to and claims a nanocomposite composition of clay and benzoxazine monomer, oligomer, and/or polymer in amount effective to form a nanocomposite. The clay is described as a silicate comprised of multiple platelets, or a hydrated aluminum silicate comprised of multiple platelets. Clay, reads the '270 patent, is typically derived from the weathering of rocks that can be an aggregate having a particle size of less than about 200 microns, such as less than about 100 microns, like less than about 50 microns, examples of which being montmorillonite, atapulgite, illite, bentonite, and halloysite.

Blends of epoxy resins and benzoxazines are also known. See e.g. U.S. Pat. Nos. 4,607,091 (Schreiber), 5,021,484 (Schreiber), 5,200,452 (Schreiber), and 5,445,911 (Schreiber). These blends appear to be potentially useful commercially, as the epoxy resins can reduce the melt viscosity of benzoxazines allowing for the use of higher filler loading while maintaining a processable viscosity. However, epoxy resins oftentimes undesirably increase the temperature at which benzoxazines polymerize.

Ternary blends of epoxy resins, benzoxazine and phenolic resins are known as well. See U.S. Pat. No. 6,207,786 (Ishida), and S. Rimdusit and H. Ishida, "Development of new class of electronic packaging materials based on ternary system of benzoxazine, epoxy, and phenolic resin", *Polymer*, 41, 7941-49 (2000).

Blends of benzoxazines and curable materials other than epoxy and/or phenolics are also known. To that end, U.S. Pat. No. 6,620,925 (Musa) is directed to and claims a curable composition comprising certain benzoxazine compounds without reactive functionality other than the benzoxazine (apart from allyl and propargyl which are disclosed but not claimed) and a curable compound or resin selected from vinyl ethers, vinyl silanes, compounds or resins containing vinyl or allyl functionality, thiol-enes, compounds or resins containing cinnamyl or styrenic functionality, fumarates, maleates, acrylates, maleimides, cyanate esters, and hybrid resins containing contain both vinyl silane and cinnamyl, styrenic, acrylate or maleimide functionality.

In addition, U.S. Pat. No. 6,743,852 (Dershem) discloses combinations of liquid benzoxazines and a thermosetting resin composition for adhering materials with dissimilar coefficients of thermal expansion comprising a) a benzoxazine compound in liquid form, b) thermoset compounds including epoxy, cyanate ester, maleimide, acrylate, methacrylate, vinyl ether, styrenic, vinyl ester, propargyl ether, diallyl amide, aromatic acetylene, benzocyclobutene, thiolenes, maleate, oxazoline, and itaconate, c) optionally, one or more anti-oxidants, bleed control agents, fillers, diluents, coupling agents, adhesion promoters, flexibilizers, dyes and pigments, and d) a cure initiator.

Y. Cui, et al. have reported on the synthesis and characterization of polyurethane/polybenzoxazine-based interpenetrating polymer networks. See Y. Cui, et al., "Synthesis and Characterization of Polyurethane/Polybenzoxazine-Based Interpenetrating Polymer Networks (IPNs)", School of Chemistry and Chemical Technology, Polymer International, 52:1246-1248 (2003).

T. Takeichi, et al. have reported on the synthesis and characterization of poly(urethane-benzoxazine) films as novel type of polyurethane/phenolic resin composites. See T. Takeichi, et al., "Synthesis and Characterization of Poly(urethane-benzoxazine) Films as Novel Type of Polyurethane/Phenolic Resin Composites", School of Material Science, Toyohashi University of Technology, 4165-4176 (2000).

To date however it is believed that curable composition based on the combination of benzoxazines, adducts of epoxy resin, hydroxy (such as phenolic) end-capped polyurethane compounds and phenolic compounds, epoxy resins, polyether sulfone tougheners and silica having a mean particle diameter on the order of $10^{-9}$ meters have not been sold or reported. Nor have prepregs, towrpregs or performs made from such curable compositions been sold or reported either.

SUMMARY

The present invention relates to curable compositions of (a) benzoxazines, (b) a toughening component comprising a combination of adducts one of which is prepared from hydroxy-containing compounds, isocyanate-containing compounds and phenolic compounds and the second of which is prepared from the first adduct and epoxy-containing compounds, (c) a component reactive with the benzoxazine, such as epoxy resins, episulfide resins and oxetane resins, (d) tougheners, in some instances in the form of thermoplastic particles, such as a polyether sulfone, ATBN and/or core shell material, and (e) a silica component, where the silica has a mean particle diameter on the order of $10^{-9}$ meters, such as from 1 to 1,000 nm.

More specifically, and particularly desirable, the so defined curable composition is useful as a matrix resin with continuous fibers such as carbon fiber in the prepreg or towpreg context and/or with a plurality of fiber or fabric plies in the perform context (such as in a resin film infusion process), such that when cured the prepreg, towpreg or composite formed from the preform product demonstrates at least one of the following properties (normalized to 60% fiber volume fraction):

(i) compression after impact of at least 30 ksi {210 Mpa} at 30 Joules impact;
(ii) open hole compression of at least 30 ksi;
(iii) fire heat release HRR less than 65 kW/m² and HR of less than 65 kW*min/m², smoke density less than 100, toxic material release performance of less than 1000 ppm for CO, less than 150 ppm for each HCN and HCl and less than 100 ppm for each HF, nitrogen oxides (NOx) and sulfur ($SO_2$+$H_2S$);
(iv) Hot/Wet Tg of at least 140° C.; and
(v) elongation of 1.5% to 6%.

Each of the above (and other) components are described in detail in the section below entitled Detailed Description of the Invention.

BRIEF DESCRIPTION OF THE FIGURE

In FIG. 1, the term "polyol" refers to the polybutyleneoxide diol shown as the first reactant in portion A; the term "PU" refers to polyurethane linkage(s); the term "EP" refers to diglycidyl ether of bisphenol A, or epoxidized phenol; and the term "BPA" refers to bisphenol A shown as the second reactant in portion E.

DETAILED DESCRIPTION

Benzoxazines

Figure 1:
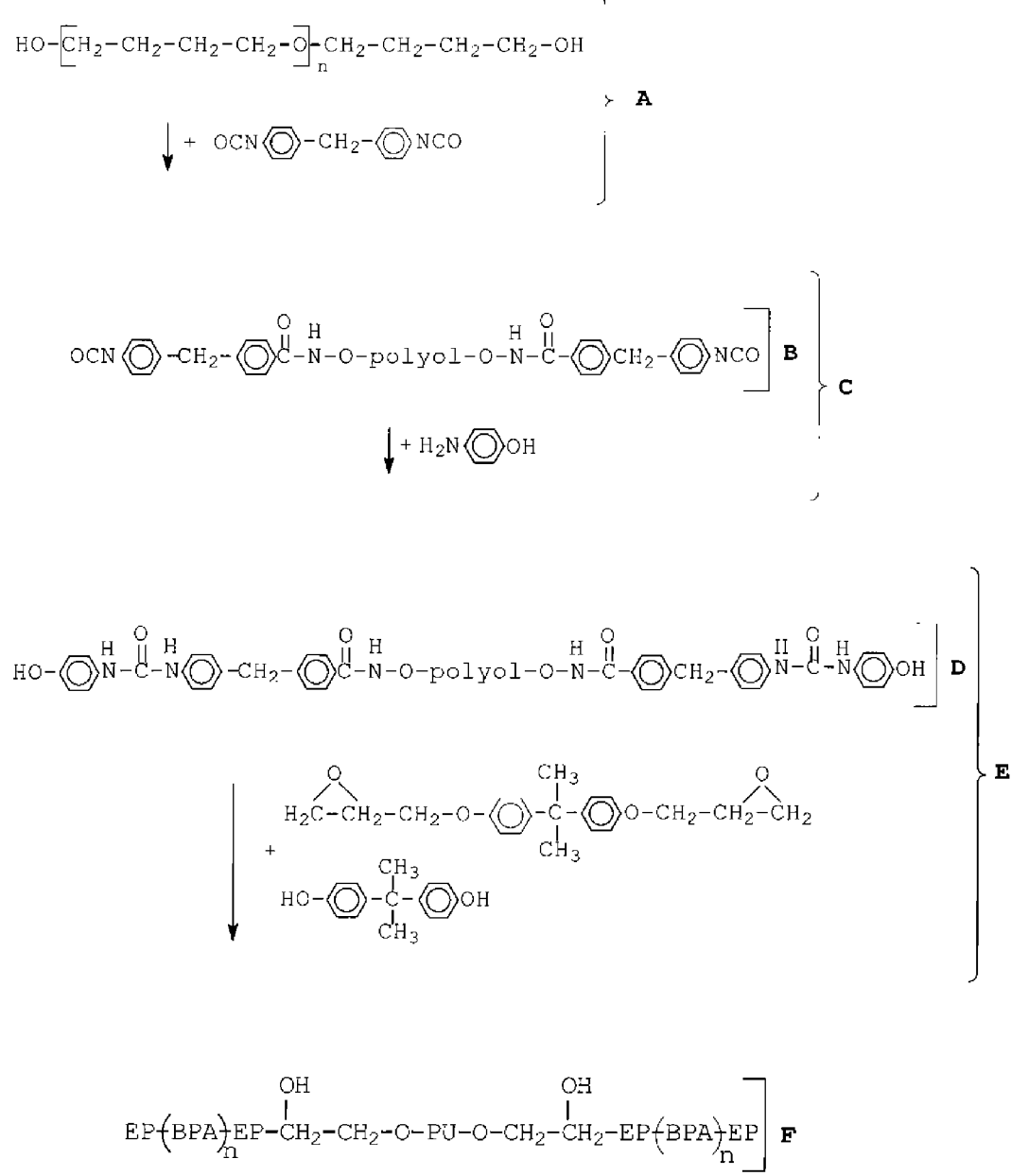
FIG. 1 depicts a synthetic scheme by which an adduct of hydroxy-containing compounds, isocyanate-containing compounds and phenolic compounds ("first adduct") and an adduct of the first adduct, epoxy-containing compounds and phenolic compounds ("second adduct") used in the inventive composition may be prepared.

The benzoxazine may be embraced by the following structure:

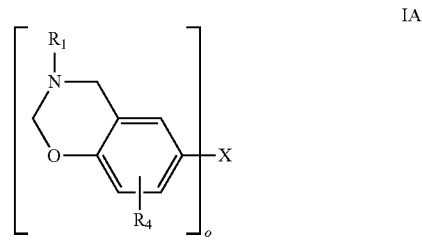

IA where o is 1-4, X is selected from a direct bond (when o is 2), alkyl (when o is 1), alkylene (when o is 2-4), carbonyl (when o is 2), thiol (when o is 1), thioether (when o is 2), sulfoxide (when o is 2), and sulfone (when o is 2), $R_1$ is selected from hydrogen, alkyl, alkenyl and aryl, and $R_4$ is selected from hydrogen, halogen, alkyl and alkenyl, or More specifically, within structure I the benzoxazine may be embraced by the following structure:

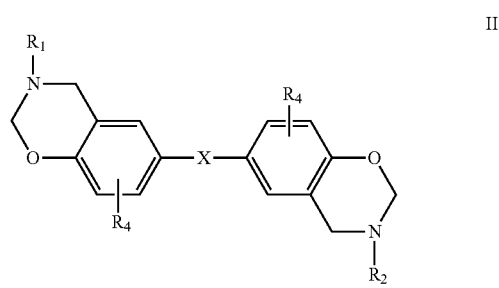

II where X is selected from a direct bond, $CH_2$, $C(CH_3)_2$, C=O, S, S=O and O=S=O, $R_1$ and $R_2$ are the same or different and are selected from hydrogen, alkyl, such as methyl, ethyl, propyls and butyls, alkenyl, such as allyl, and aryl and $R_4$ are the same or different and are selected from hydrogen or alkenyl, such as allyl.

Representative benzoxazines within structure II include:

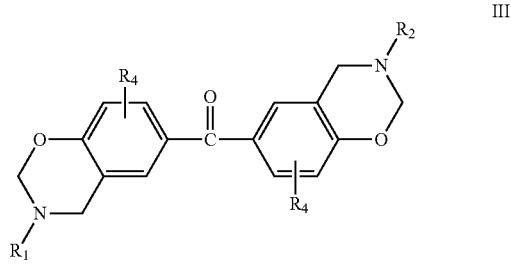

III

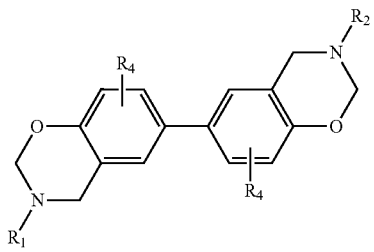

IV

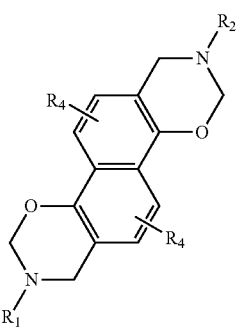

VIII

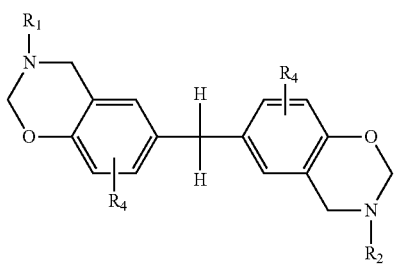

V

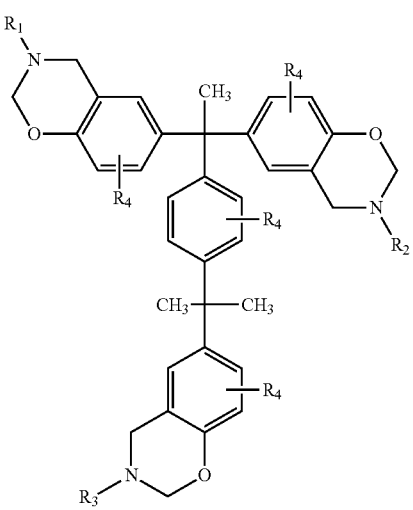

IX

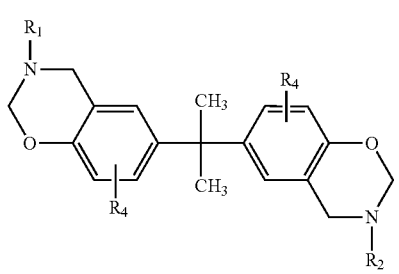

VI where $R_1$, $R_2$ and $R_4$ are as defined above.

Alternatively, the benzoxazine may be embraced by the following structure:

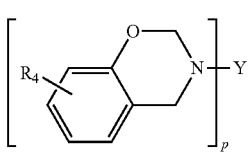

VII where p is 2, Y is selected from biphenyl (when p is 2), diphenyl methane (when p is 2), diphenyl isopropane (when p is 2), diphenyl sulfide (when p is 2), diphenyl sulfoxide (when p is 2), diphenyl sulfone (when p is 2), and diphenyl ketone (when p is 2), and $R_4$ is selected from hydrogen, halogen, alkyl and alkenyl.

Though not embraced by structures I or VII additional benzoxazines are within the following structures:

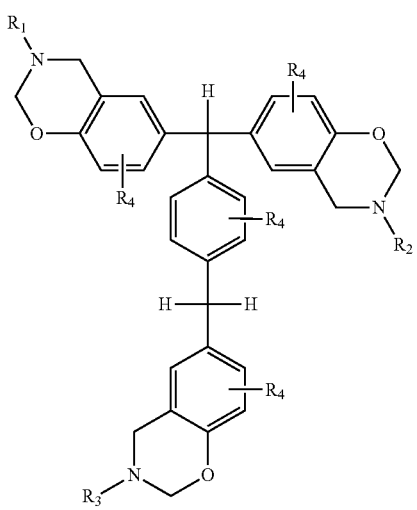

X where $R_1$, $R_2$ and $R_4$ are as defined above, and $R_3$ is defined as $R_1$, $R_2$ or $R_4$.

Specific examples of these benzoxazines include:

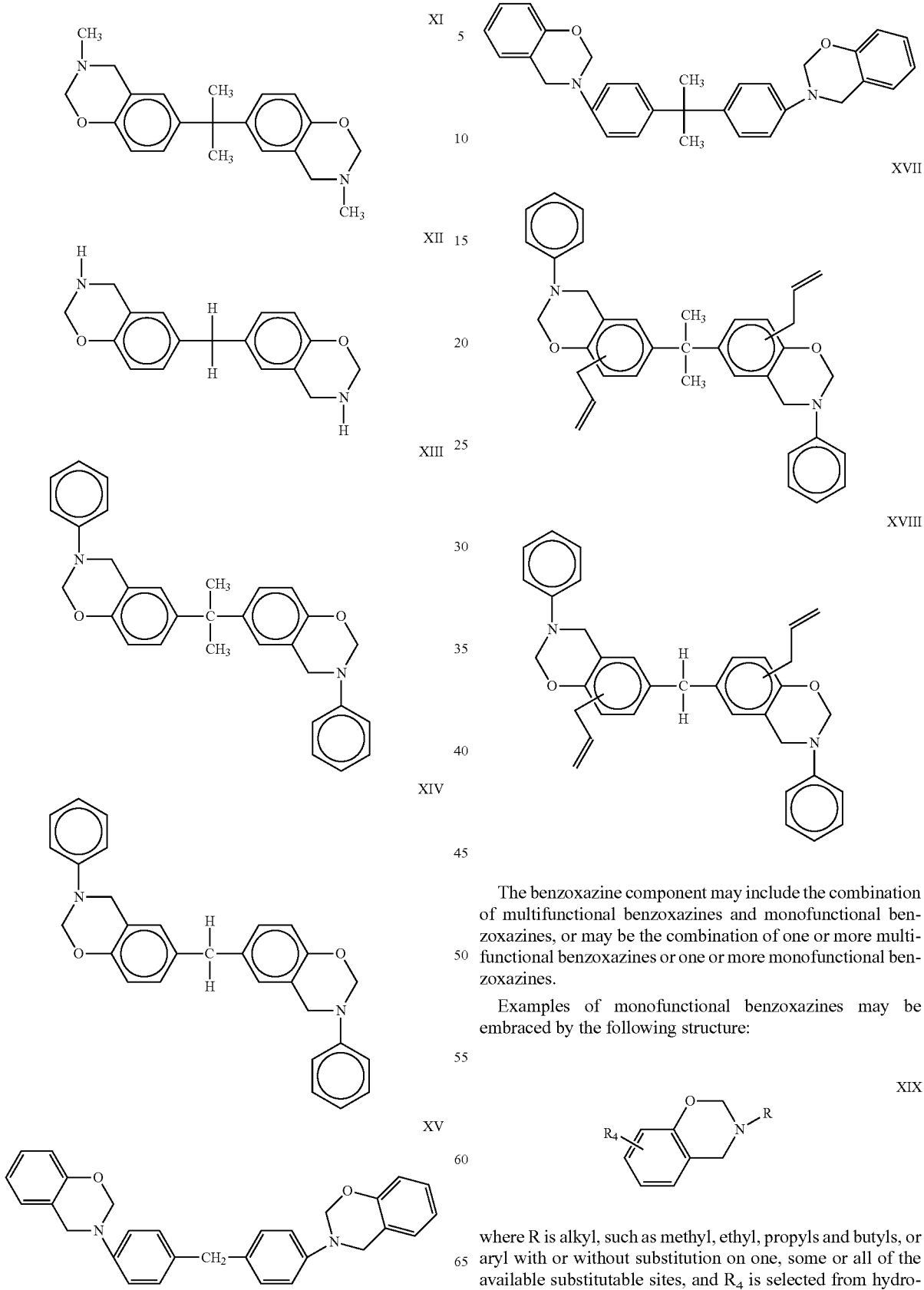

The benzoxazine component may include the combination of multifunctional benzoxazines and monofunctional benzoxazines, or may be the combination of one or more multifunctional benzoxazines or one or more monofunctional benzoxazines.

Examples of monofunctional benzoxazines may be embraced by the following structure:

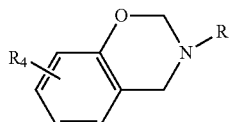

where R is alkyl, such as methyl, ethyl, propyls and butyls, or aryl with or without substitution on one, some or all of the available substitutable sites, and $R_4$ is selected from hydrogen, halogen, alkyl and alkenyl.

For instance, monofunctional benzoxazines may be embraced by the structure

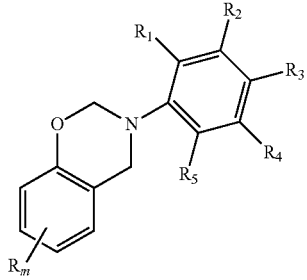

XX where in this case R is selected from alkyl, alkenyl, each of which being optionally substituted or interrupted by one or more O, N, S, C=O, COO, and NHC=O, and aryl; m is 0-4; and $R_1$-$R_5$ are independently selected from hydrogen, alkyl, alkenyl, each of which being optionally substituted or interrupted by one or more O, N, S, C=O, COOH, and NHC=O, and aryl.

Specific examples of such a monofunctional benzoxazine are:

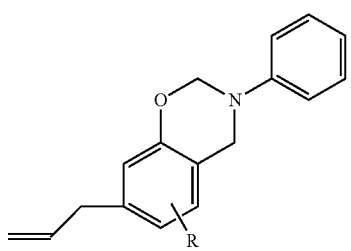

XXI where R is as defined above; or

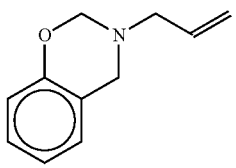

XXII

Benzoxazines are presently available commercially from several sources, including Huntsman Advanced Materials; Georgia-Pacific Resins, Inc.; and Shikoku Chemicals Corporation, Chiba, Japan, the last of which offers among others B-a, B-m, F-a, C-a, Pd and F-a benzoxazine resins.

If desired, however, instead of using commercially available sources, the benzoxazine may typically be prepared by reacting a phenolic compound, such as a bisphenol A, bisphenol F, bisphenol S or thiodiphenol, with an aldehyde and an alkyl or aryl amine. U.S. Pat. No. 5,543,516, hereby expressly incorporated herein by reference, describes a method of forming benzoxazines, where the reaction time can vary from a few minutes to a few hours, depending on reactant concentration, reactivity and temperature. See also Burke et al., *J. Org. Chem.*, 30(10), 3423 (1965); see generally U.S. Pat. Nos. 4,607,091 (Schreiber), 5,021,484 (Schreiber), 5,200,452 (Schreiber) and 5,443,911 (Schreiber).

The benzoxazine should be present in the inventive composition in an amount in the range of about 10 to about 90 percent by weight, such as about 25 to about 75 percent by weight, desirably about 35 to about 65 percent by weight, based on the total weight of the composition.

Benzoxazine polymerization can be self-initiated under elevated temperature conditions and also by inclusion of cationic initiators, such as Lewis acids, and other known cationic initiators, such as metal halides; organometallic derivatives; metallophorphyrin compounds such as aluminum phthalocyanine chloride; methyl tosylate, methyl triflate, and triflic acid; and oxyhalides. Likewise, basic materials, such as imidizaoles, may be used to initiate polymerization.

Adducts

First Adduct

Reference to FIG. 1 may be helpful in understanding how the first adduct useful herein may be prepared.

The first adduct as noted is prepared from hydroxy-containing compounds, isocyanate-containing compounds and phenolic compounds. Portion A in FIG. 1 shows the reaction of a hydroxy-containing compound with an isocyanate-containing compound to yield a polyurethane with isocyanate terminal groups, shown as portion B. The polyurethane with isocyanate terminal groups is then reacted with a phenolic compound, here the hydroxyl amine p-amino phenol, to yield the first adduct, a hydroxy terminated polyurethane prepolymer, shown as portion D. This reaction is shown as portion C in FIG. 1.

For these reactants, the hydroxy-containing compound, such as a hydroxy terminated polyalkylene ether, may be reacted with an isocyanate-containing compound, such as a diisocyanate, for a time and amount sufficient to ensure isocyanate capping of the hydroxy terminated polyalkylene ether. Thus, the hydroxy terminated polyalkylene ether may be mixed with the diisocyanate and reacted at a temperature in the range of about 50° C. to about 80° C. for a period of about 0.5 to 2.5 hours, desirably under an inert atmosphere, such as a nitrogen blanket, to form an isocyanate-terminated polyurethane prepolymer, with which may be reacted a phenolic compound, such as an hydroxyl amine, resulting in the formation of an hydroxyl-terminated polyurethane prepolymer (see portions C and D in FIG. 1).

Despite that which is shown in FIG. 1, the hydroxy-terminated polyurethane adduct formed as the first adduct can be prepared by alternative routes depending on the nature of the starting reactants.

For instance, and not shown in FIG. 1, the prepolymer can first be reacted with phosgene, and the resulting chlorocarbonyloxy derivative can then be reacted with a hydroxy containing compound, such as phenol or aminophenol.

More broadly speaking, though with general reference to FIG. 1, the hydroxy-containing compound, such as a hydroxylated polyalkylene ether, is reacted with the isocyanate-containing compound, such as a polyisocyanate, optionally in the presence of a catalyst, such as a condensation catalyst suitable for catalyzing the reaction between hydroxyl groups and isocyanate groups. The hydroxy-containing compound and the isocyanate-containing compound are allowed to react until a urethane prepolymer is formed, which terminates with isocyanate groups and substantially polyalkylene ether, no hydroxyl group present from the hydroxylated groups remains.

As noted, this reaction may be performed in the presence of a condensation catalyst. Examples of such catalysts include the stannous salts of carboxylic acids, such as stannous octoate, stannous oleate, stannous acetate, and stannous laureate; dialkyltin dicarboxylates, such as dibutyltin dilaureate and dibutyltin diacetate; tertiary amines and tin mercaptides. When used, the amount of catalyst employed is generally between about 0.00025 and about 5 percent by weight of the catalyzed reactants, depending on the nature of the reactants.

The hydroxy-containing compounds used to make the polyurethane prepolymer should have a molecular weight of 1,500 to 3,000 molecular weight (number average, "Mn"), and the isocyanate-containing compound should have a molecular weight of 150 to 400 Mn for monomeric isocyanate-containing compounds and up to 2,000 Mn for polymeric isocyanate-containing compounds, as measured by gel permeation chromatography ("GPC") using polyethylene glycol standards for calibration purposes.

The first adduct thus should have a molecular weight in the range of 55,000 to 90,000 Mn, such as 65,000 to 75,000 Mn, measured as before with GPC.

The first adduct should desirably have a softening point below 120° C.

The first adduct may be used in an amount of 0.05 to 20, such as 0.5 to 10, percent by weight.

Hydroxy-Containing Compounds

The hydroxy-containing compounds, such as hydroxylated polyalkylene ethers, form a polyurethane prepolymer with the isocyanate-containing compound. The polyalkylene ethers include a series of hydrocarbon groups separated by oxygen atoms and terminated with hydroxyl. The hydrocarbon groups should be alkylene groups—straight or branched chain—and should have from 2 to about 6 carbons, such as about 2 to about 4 carbon atoms, desirably about 3 to about 4 carbon atoms.

The alkylene groups may be thus derived from ethylene oxide, propylene oxides, butylene oxides or tetrahydrofuran. Preferably, the polyether polyols are used to prepare the prepolymer have a functionality of about 2 to about 6, such as about 2 to about 4, desirably from about 2 to about 3. Thus, the hydroxylated polyalkylene ether should have a molecular weight of about 400 to about 8,000 Mn, such as about 1,000 to about 3,000 Mn.

The hydroxy-containing compounds may also be segmented prepolymers containing polyether segments, such as polyether-amides, polyether-urethanes and polyether-ureas. Polyalkylene as used in this context refers to a polyether having repeating units containing straight or branched chain alkylene groups.

Other examples of hydroxy-containing compounds include polyalkylene thioether-polyols, for example the polycondensation products of thiodiglycol with itself and with diols and/or polyols, for example, 1,6-hexanediol, triethylene glycol, 2,2-dimethyl-1,3-propanediol or 1,1,1-trimethylolpropane.

Still other examples include hydroxyl-terminated polybutadienes or polyalkylene oxide diols, such as polypropylene oxide diols like those sold under the tradenames ACCLAIM by Bayer AG and POLYMEG, by Lyondell Chemical Co., Houston, Tex. For example, ACCLAIM 2200 and POLYMEG 2000 are commercially available poly(propylene ether) diols useful in the present invention. In addition, TERATHANE 2000, which is a poly(butylenes ether) diol, is also particularly useful herein.

The hydroxy-containing compounds may conform to structure XXIII:

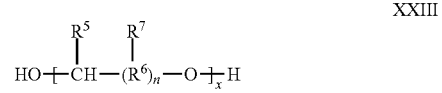

where $R^5$ is H, $R^6$ is CH, $R^7$ is H, n is 2-6, such as 3-4 and x is 12-45, such as 20-35.

In addition, amino-terminated polyalkylene ethers may be used instead of or in connection with hydroxyl-terminated polyalkylene ethers and they may be embraced by structure XXIV:

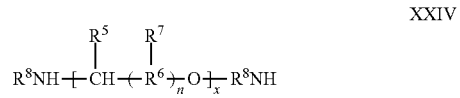

where $R^5$, $R^6$, $R^7$, n and x are defined, and $R^8$ is alkylene as in structure XXIII.

In addition, the hydroxy-containing compounds may be hydroxy-terminated polyesters.

Hydroxy-terminated polyesters include a wide variety of materials including polyalkylene glycol esters such as polyethylene and polypropylene glycol esters.

Among the useful polyester diols are polyaliphatic and polyaromatic esters. Among the more desirable esters are the aromatic esters such as those conforming to structure XXV

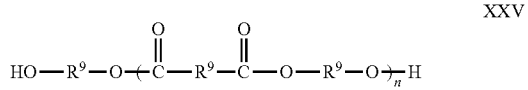

where $R^9$ is a poly(alkylene) or poly(arylene) radical and n is 1-100.

Polyaromatic esters such as those having structure XXIV are also useful:

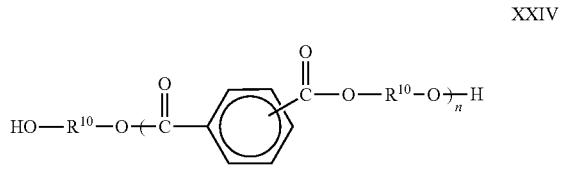

where $R^{10}$ is $C_{2-10}$ polyalkylene oxide, and desirably di-, tri- or tetra-methylene oxide.

While the hydroxy-containing compounds have been discussed under this heading, alternatives for use herein include amino and thiol versions thereof. And of course combinations of such compounds may be used herein.

The hydroxy-containing compound should be used in a percent by weight ratio to isocyanate-containing compound in a range of 1:10 to 1:2, such as 1:8 to 1:4, for instance 1:6.

Isocyanate-Containing Compounds

The isocyanate-containing compounds used to prepare the isocyante-terminated polyurethane should be a polyisocyanate, such as a diisocyanate (for instance an aliphatic, cycloaliphatic, aromatic or araliphatic one) or triisocyanate, which is reactive with the hydroxyl-containing compound, as described above or, if desirable, in combination with chain lengtheners (short-chain polyhydroxyl, polysulfhydryl or polyamine compounds), or a polyisocyanate prepolymer derived from a prepolymer polyamine, such as a prepolymer polyetheramine.

A variety of diisocyanates are useful for reaction in this regard and the choice of any particular one will be left to those persons of ordinary skill in the art, likely to be dictated in part by the commercial availability and in part by the end use properties desired.

Useful diisocyanates include, ethylene diisocyanate, trimethylene diisocyanate, tetramethylene diisocyanate, pentamethylene diisocyanate, hexamethylene diisocyanate, heptamethylene diisocyanate, octamethylene diisocyanate, decamethylene diisocyanate, dodecamethylene diisocyanate, tetradecamethylene diisocyanate, hexadecamethylene diisocyanate, octadecamethylene diisocyanate, eicosamethylene diisocyanate, cyclohexamethylene diisocyanate, cyclopenthalene diisocyanate, or cyclohepthalene diisocyanate, or bis-cyclohexylene, cyclohexylmethylene diisocyanate, tetramethylxylylene diisocyanate, phenyl diisocyanate, toluene diisocyanate (such as, 2,4-diisocyanatotoluene and 2,6-diisocyanatotoluene), 4,4'-diphenyl diisocyanate, 4,4'-diphenylene methane diisocyanate, dianisidine diisocyanate, 1,5-naphthalene diisocyanate, 4,4'-diphenyl ether diisocyanate, p-phenylene diisocyanate, 4,4'-dicyclohexylmethane diisocyanate, 1,3-bis-(isocyanatomethyl)cyclohexane, cyclohexylene diisocyanate, tetrachlorophenylene diisocyanate, 2,6-diethyl-p-phenylenediisocyanate, 3,5-diethyl-4,4'-diisocyanatodiphenyl-methane, tetramethylene diisocyanate, hexamethylene diisocyanate, ethylene diisocyanate, cyclohexylene diisocyanate, nonamethylene diisocyanate, octadecamethylene diisocyanate, 2-chloropropane diisocyanate, 2,2'-diethylether diisocyanate, 3-(dimethylamine) pentane diisocyanate, tetrachlorophenylene diisocyanate-1,4,3-heptane diisocyanate and transvinylene diisocyanate.

Additional examples of suitable isocyanates are urethanized 4,4'-diisocyanatodiphenylmethane, carbodiimidized 4,4'-diisocyanatodiphenylmethane, the uretdione of 2,4-diisocyanatotoluene, triisocyanatotriphenylmethane, the adduct formed from diisocyanatotoluene and trimethylolpropane, the trimer formed from diisocyanatotoluene, diisocyanato-m-xylylene, N,N'W-di-(4-methyl-3-isocyanatophenyl)-urea, mixed trimerization products of diisocyanatotoluene and 1,6-diisocyanatohexamethylene, 1,6-diisocyanatohexane, 3,5,5-trimethyl-1-isocyano-3-isocyanatomethylcyclohexane (isophorene diisocyanate), N,N', N"'-tri-(6-isocyanatohexyl)-biuret, 2,2,4-trimethyl-1,6-diisocyanatohexane, 1-methyl-2,4-diisocyanatocyclohexane, diisocyanate, 4,4'-diisocyanatodicyclohexylmethane, trimeric isophorene, diisocyanate, trimeric hexane diisocyanate and methyl 2,6-diisocyanatohexanoate.

As noted above, chain lengtheners may be used as well, examples of which include diols and polyols, such as 1,4-butanediol, 1,1,1-trimethylolpropane or hydroquinone 2-hydroxyethyl ether, or diamines, such as diaminoethane, 1,6-diaminohexane, piperazine, 2,5-dimethylpiperazine, 1-amino-3-aminomethyl-3,5,5-trimethylcyclohexane, 4,4'-diaminocyclohexylmethane, 1,4-diaminocyclohexane and 1,2-propylenediamine, or hydrazine, amino acid hydrazides, hydrazides of semicarbazidocarboxylic acids, bis-hydrazides and bis-semicarbazides.

Capping Agent

The capping agent used to react with the isocyanate-terminated group of the isocyanate-terminated polyurethane prepolymer in portion C of FIG. 1 is an hydroxyl amine compound which may be selected from a variety of materials, such as amino phenol, as shown in FIG. 1.

More generally, the capping agent useful is any hydroxyl-containing compound reactive with the isocyanate including functionalized aliphatic alcohols and aromatic alcohols, such as phenol, and which under appropriate reaction conditions reacts with the isocyanate groups of the isocyanate-terminated polyurethane prepolymer.

The capping agent and isocyanate-terminated polyurethane prepolymer may be reacted at an appropriate temperature for a sufficient time to cause reaction between the isocyanate groups and the amino groups on the capping agent. Preferably, this reaction continues for a period of about 20 minutes to about 120 minutes, at a temperature in the range of 50 to 100° C. A catalyst, such as any of the condensation catalysts discussed above, may be used to enhance reaction times in preparing the first adduct.

And of course combinations of such compounds may be used herein.

As all of the isocyanate-containing compound is reacted with the capping agent, an appropriate amount of capping agent is to be used to facilitate such reaction. The precise amount of course will depend on the nature, identity and amount of the remaining reactants that are used to form the first adduct and as such will be left to the discretion of those persons of ordinary skill in the art.

Second Adduct

The adducts of hydroxy end-capped polyurethane compounds, epoxy-containing compounds and phenolic compounds may be prepared from the following components, described below under separate headings.

Again reference to FIG. 1 may be helpful in understanding how the second adduct useful herein may be prepared.

The second adduct may be used in an amount of 0.5 to 10, such as 1 to 5, for instance 2 to 4 weight percent, based on the total amount of the composition.

Hydroxy End-Capped Polyurethane Compounds

The first adduct is as described above, and may be used in an amount of 0.05 to 10, such as 0.1 to 5, for instance 0.25 to 1, percent by weight of the component used to form the second adduct together with the following components.

Epoxy-Containing Compound

Commercially available epoxy-containing compounds for use in preparing the adducts are illustrated below.

The epoxy-containing compounds used to form the adduct with the hydroxy end-capped polyurethane and phenolic compounds may include multifunctional epoxy-containing compounds, such as $C_1$-$C_{28}$ alkyl-, poly-phenol glycidyl ethers; polyglycidyl ethers of pyrocatechol, resorcinol, hydroquinone, 4,4'-dihydroxydiphenyl methane (or bisphenol F, such as RE-303-S or RE-404-S available commercially from Nippon Kayuku, Japan), 4,4'-dihydroxy-3,3'-dimethyldiphenyl methane, 4,4'-dihydroxydiphenyl dimethyl methane (or bisphenol A), 4,4'-dihydroxydiphenyl methyl methane, 4,4'-dihydroxydiphenyl cyclohexane, 4,4'-dihydroxy-3,3'-dimethyldiphenyl propane, 4,4'-dihydroxydiphenyl sulfone, and tris(4-hydroxyphyenyl)methane; polyglycidyl ethers of transition metal complexes; chlorination and bromination products of the above-mentioned diphenols; polyglycidyl ethers of novolacs; polyglycidyl ethers of diphenols obtained by esterifying ethers of diphenols obtained by esterifying salts of an aromatic hydrocarboxylic acid with a dihaloalkane or dihalogen dialkyl ether; polyglycidyl ethers of polyphenols obtained by condensing phenols and long-chain halogen paraffins containing at least two halogen atoms; phenol novolac epoxy; cresol novolac epoxy; and combinations thereof.

Among the commercially available epoxy-containing compounds suitable for use in the present invention are polyglycidyl derivatives of phenolic compounds, such as those available under the tradenames EPON 825, EPON 826, EPON 828, EPON 1001, EPON 1007 and EPON 1009 or waterborne dispersions under the tradenames EPI-REZ 3510, EPI-REZ 3515, EPI-REZ 3520, EPI-REZ 3522, EPI-REZ 3540 or EPI-REZ 3546 from Hexion; DER 331, DER 332, DER 383, DER 354, and DER 542 from Dow Chemical Co.; GY285 from Huntsman, Inc.; and BREN-S from Nippon Kayaku, Japan. Other suitable epoxy-containing compounds include polyepoxides prepared from polyols and the like and polyglycidyl derivatives of phenol-formaldehyde novolacs, the latter of which are available commercially under the tradenames DEN 431, DEN 438, and DEN 439 from Dow Chemical Co. and a waterborne dispersion ARALDITE PZ 323 from Huntsman.

Cresol analogs are also available commercially such as ECN 1273, ECN 1280, ECN 1285, and ECN 1299 or waterborne dispersions ARALDITE ECN 1400 from Huntsman, Inc. SU-8 and EPI-REZ 5003 are bisphenol A-type epoxy novolacs available from Hexion. Epoxy or phenoxy functional modifiers to improve adhesion, flexibility and toughness, such as the HELOXY brand epoxy modifiers 67, 71, 84, and 505. When used, the epoxy or phenoxy functional modifiers may be used in an amount of about 1:1 to about 5:1 with regard to the heat curable resin.

Of course, combinations of the different epoxy are also desirable for use herein.

The epoxy-containing compounds should be used to form the second adduct in percent by weight ratio with the first adduct and the phenolic compound of 4:3:3 to 7:0.5:2.5, such as 6:1:3. Thus, it is seen that the epoxy-containing compounds are used in a large excess to the other components.

Phenolic Compounds

Phenolic compounds may be reacted together with the epoxy-containing compounds and hydroxy-terminated polyurethane first adduct to form the second adduct. As shown in portion E of FIG. 1, the second adduct (shown as portion F of FIG. 1) may be formed from the first adduct and a phenolic compound and a epoxy-containing compound. Specifically, in FIG. 1 a glycidyl ether of bisphenol A is used as an epoxy-containing compound and bisphenol A is used as a phenolic compound.

While effectively any di- or poly-phenolic compound may be used herein, it is desirable for the phenolic compound to be a bisphenol compound, such as A, F or S.

The phenolic compounds are reacted with a portion of the epoxy-containing compounds and then into the first adduct to form the second adduct.

Epoxy Resins

The epoxy resin chosen for use in the inventive composition may be selected from any of the epoxy-containing compounds described above in connection with forming the adduct.

A portion of the epoxy-containing compound that is not reacted with the phenolic compound may be used as a carrier for the formed second adduct.

Tougheners

Illustrative tougheners when used include copolymers based on butadiene/acrylonitrile, butadiene/(meth)acrylic acid esters, butadiene/acrylonitrile/styrene graft copolymers ("ABS"), butadiene/methyl methacrylate/styrene graft copolymers ("MBS"), poly(propylene) oxides, amine-terminated butadiene/acrylonitrile copolymers ("ATBN") and hydroxyl-terminated polyether sulfones, such as PES 5003P, available commercially from Sumitomo Chemical Company, Japan.

Additional tougheners include core shell polymers, such as PS 1700, available commercially from Union Carbide Corporation, Danbury, Conn.; and BLENDEX 338, SILTEM STM 1500 and ULTEM 2000, which are available commercially from General Electric Company. ULTEM 2000 (CAS Reg. No. 61128-46-9) is a polyetherimide having a molecular weight ("Mw") of about 30,000±10,000.

Other tougheners include a rubber-modified epoxy resin, for instance an epoxy-terminated adduct of an epoxy resin and a diene rubber or a conjugated diene/nitrile rubber. This epoxy-terminated adduct is suitably prepared in the reaction of a polyepoxide, a compound having an average of more than one epoxy group as described hereinbefore, with a carboxy-functional conjugated diene rubber or a conjugated diene/nitrile rubber. The diene rubber is a polymer of a conjugated diene monomer such as butadiene and isoprene. Butadiene rubbers are preferred. Conjugated diene/nitrile rubbers are copolymers of a conjugated diene and an ethylenically unsaturated nitrile monomer, of which acrylonitrile is desirable. When a conjugated diene/nitrile rubber is used, at least one such rubber present in the composition contains less than about 30 weight percent polymerized unsaturated nitrile, and preferably no more than about 26 weight percent polymerized unsaturated nitrile. The rubber also contains terminal groups that will react with an epoxide to form a covalent bond thereto. Preferably, the rubber contains from about 1.5, more preferably from about 1.8, to about 2.5, more preferably to about 2.2, of such terminal groups per molecule, on average. Carboxyl-terminated rubbers are preferred. The rubber is preferably a liquid at room temperature, and preferably has a glass transition temperature of less than about −25° C., preferably from about −30 to about −90° C. The Mw of the rubber is suitably from about 2,000 to about 6,000, more preferably from about 3,000 to about 5,000. Suitable carboxyl-functional butadiene and butadiene/acrylonitrile rubbers are commercially available from Noveon under the HYCAR tradename, such as HYCAR 2000X162 carboxyl-terminated butadiene homopolymer and HYCAR 1300X31 carboxyl-terminated butadiene/acrylonitrile copolymer. A suitable amine-terminated butadiene/acrylonitrile copolymer ("ATBN") is sold under the tradename HYCAR 300X21. Other examples of nitrile rubbers include HYCAR 1300X8, HYCAR 1300X13, HYCAR 1300X9, HYCAR 1300X18 and HYCAR 1300X31 carboxyl-terminated butadiene acrylonitrile copolymers, all commercially available from Noveon.

The conjugated diene or conjugated diene/nitrile rubber is formed into an epoxy-terminated adduct by reaction with an excess of a polyepoxide. A wide variety of polyepoxide compounds such as cycloaliphatic epoxides, epoxidized novolac resins, epoxidized bisphenol A or bisphenol F resins, butanediol polyglycidyl ether, neopentyl glycol polyglycidyl ether or flexible epoxy resins can be used, but generally preferred on the basis of cost and availability are liquid or solid glycidyl ethers of a bisphenol such as bisphenol A or bisphenol F. Halogenated, particularly brominated, resins can be used to impart flame retardant properties if desired. For forming the adduct, liquid epoxy resins (such as bisphenol A epoxy resins, DER 331, available from The Dow Chemical Company) are especially preferred for ease of handling if making the adduct.

Typically, the rubber and an excess of the polyepoxide are mixed together with a polymerization catalyst such as a substituted urea or phosphine catalyst, and heated to a temperature of about 100 to about 250° C. in order to form the adduct. Preferred catalysts include henyl dimethyl urea and triphenyl phosphine. Preferably, enough of the polyepoxide compound is used that the resulting product is a mixture of the adduct and free polyepoxide compound.

Tougheners are characterized by having glass transition temperatures below about 0° C., preferably below about 30° C. Examples of such tougheners and impact modifiers include, but are not limited to, reaction products of reactive copolymers of butadiene (e.g., carboxyl-terminated butadiene-nitrile rubbers, such as the products sold under the brand name HYCAR) with epoxy resins (as described, for example, in U.S. Patent Application Publication No. 2003/0196753), polyurethanes, adducts of dimeric fatty acids with epoxy resins, the reaction products of isocyanate-terminated prepolymers and compounds having one or more phenolic, benzyl alcohol, aminophenyl or benzylamino groups (such as those described in International Patent Publication No. WO 2005/007766, incorporated herein by reference in its entirety). Such tougheners or impact modifiers may, for example, be present in the curable compositions at levels of from about 0.1 to about 40 weight percent.

Rubber particles having a core-shell structure are another example of useful tougheners or impact modifiers. Such particles generally have a core comprised of a polymeric material having elastomeric or rubbery properties (i.e., a glass transition temperature less than about 0° C., e.g., less than about −30° C.) surrounded by a shell comprised of a non-elastomeric polymeric material (i.e., a thermoplastic or thermoset/crosslinked polymer having a glass transition temperature greater than ambient temperatures, e.g., greater than about 50° C.). For example, the core may be comprised of a diene homopolymer or copolymer (for example, a homopolymer of butadiene or isoprene, a copolymer of butadiene or isoprene with one or more ethylenically unsaturated monomers such as vinyl aromatic monomers, (meth)acrylonitrile, (meth)acrylates, or the like) while the shell may be comprised of a polymer or copolymer of one or more monomers such as (meth)acrylates (e.g., methyl methacrylate), vinyl aromatic monomers (e.g., styrene), vinyl cyanides (e.g., acrylonitrile), unsaturated acids and anhydrides (e.g., acrylic acid), (meth)acrylamides, and the like having a suitably high glass transition temperature. Other rubbery polymers may also be suitably be used for the core, including polybutylacrylate or polysiloxane elastomer (e.g., polydimethylsiloxane, particularly crosslinked polydimethylsiloxane). The rubber particle may be comprised of more than two layers (e.g., a central core of one rubbery material may be surrounded by a second core of a different rubbery material or the rubbery core may be surrounded by two shells of different composition or the rubber particle may have the structure soft core, hard shell, soft shell, hard shell). In one embodiment of the invention, the rubber particles used are comprised of a core and at least two concentric shells having different chemical compositions and/or properties. Either the core or the shell or both the core and the shell may be crosslinked (e.g., ionically or covalently). The shell may be grafted onto the core. The polymer comprising the shell may bear one or more different types of functional groups (e.g., epoxy groups) that are capable of interacting with other components of the curable adhesives of the present invention.

Typically, the core will comprise from about 50 to about 95 percent by weight of the rubber particles while the shell will comprise from about 5 to about 50 percent by weight of the rubber particles.

Preferably, the rubber particles are relatively small in size. For example, the average particle size may be from about 0.03 to about 2 microns or from about 0.05 to about 1 micron. In certain embodiment of the invention, the rubber particles have an average diameter of less than about 500 nm. In other embodiments, the average particle size is less than about 200 nm. For example, the core-shell rubber particles may have an average diameter within the range of from about 25 to about 200 nm.

Methods of preparing rubber particles having a core-shell structure are well-known in the art and are described, for example, in U.S. Pat. Nos. 4,419,496, 4,778,851, 5,981,659, 6,111,015, 6,147,142 and 6,180,693, each of which being hereby expressly incorporated herein by reference in its entirety.

Rubber particles having a core-shell structure may be prepared as a masterbatch wherein the rubber particles are dispersed in one or more epoxy resins such as a diglycidyl ether of bisphenol A. For example, the rubber particles typically are prepared as aqueous dispersions or emulsions. Such dispersions or emulsions may be combined with the desired epoxy resin or mixture of epoxy resins and the water and other volatile substances removed by distillation or the like. One method of preparing such masterbatches is described in more detail in International Patent Publication No. WO 2004/108825, hereby expressly incorporated herein by reference in its entirety. For example, an aqueous latex of rubber particles may be brought into contact with an organic medium having partial solubility in water and then with another organic medium having lower partial solubility in water than the first organic medium to separate the water and to provide a dispersion of the rubber particles in the second organic medium. This dispersion may then be mixed with the desired epoxy resin(s) and volatile substances removed by distillation or the like to provide the masterbatch.

A particularly suitable dispersion of rubber particles having a core-shell structure in an epoxy resin matrix is available from Kaneka Corporation under the product name MX-120. Other commercially available masterbatches of core-shell rubber particles dispersed in epoxy resins include GENIOPEARL M23A (a dispersion of 30 weight % core-shell particles in an aromatic epoxy resin based on bisphenol A diglycidyl ether; the core-shell particles have an average diameter of about 100 nm and contain a crosslinked silicone elastomer core onto which an epoxy-functional acrylate copolymer has been grafted); the silicone elastomer core represents about 65 weight percent of the core-shell particle), available from Wacker Chemie GmbH.

Particularly desirable tougheners include the hydroxyl-terminated polyether sulfones, available commercially as PES 5003P from Sumitomo or as RADEL from Solvay Advanced Polymers, LLC, Alpharetta, Ga. Embraced by such materials are those having the structural unit

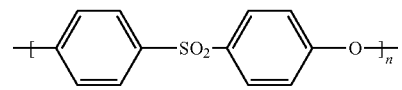

The toughener component should be present in an amount in the range of about 1 to about 50 percent by weight, such as about 10 to about 30 percent by weight, desirably about 15 to about 25 percent by weight, based on the total weight of the composition. In this amount, the toughening component may improve the performance of the inventive compositions under dynamic load.

Silica Component

The silica component should have a mean particle diameter on the nanoparticle size; that is, the silica component should have a mean particle diameter on the order of $10^{-9}$ meters. The silica nanoparticles can be pre-dispersed in epoxy resins, and may be selected from those commercially available under the tradename NANOPDX, from Nanoresins, Germany. NANOPDX is a tradename for a product family of silica nanoparticle reinforced epoxy resins showing an outstanding combination of material properties. The silica phase consists of surface-modified, synthetic $SiO_2$ nanospheres with less than 50 nm diameter and an extremely narrow particle size distribution. The $SiO_2$ nanospheres are agglomerate-free dispersions in the epoxy resin matrix resulting in a low viscosity for resins containing up to 50 wt % silica.

Commercially available examples of the NANOPDX products include NANOPDX F630 (a cycloaliphatic epoxy resin matrix), F400 (a bisphenol A epoxy resin matrix), and F520 (a bisphenol F epoxy resin matrix). These NANOPDX products are silica nanoparticle dispersions in the noted epoxy resins, at a level of up to about 50% by weight, though the manufacturer reports 40% by weight for the three noted products. These NANOPDX products are believed to have a particle size of about 5 nm to about 80 nm, though the manufacturer reports less than 50 nm.

The silica component should be present in an amount in the range of about 1 to about 60 percent by weight, such as about 3 to about 30 percent by weight, desirably about 5 to about 20 percent by weight, based on the total weight of the composition. Use of such silica components is beneficial as regards matching the viscosity of the inventive composition to processing conditions in the manufacture of prepreg, towpreg or perform.

Thus, the silica component may be a silica nanoparticle reinforced epoxy resin component, where the epoxy resin is selected from a cycloaliphatic epoxy resin matrix, a bishpenol A epoxy resin matrix, or a bisphenol F epoxy resin matrix. In use, when the silica component is a silica nanoparticle reinforced epoxy resin component, it should be present in an amount of from 3 to 30% by weight of the total composition.

The inventive compositions may also contain curing agents, which are known to those skilled in the art.

For instance, the curing agent may be a heat-activated one, such that it remains inert towards epoxy resins below a certain "threshold" temperature, which is usually at least about 80° C., and preferably at least about 100° C. or above, but reacts rapidly to effect curing once that threshold temperature has been exceeded.

Examples of curing agents generally include aliphatic, cycloaliphatic, aromatic and heterocyclic amines, such as bis-(4-aminophenyl)-methane, aniline/formaldehyde resins, bis-(4-aminophenyl) sulfone, propane-1,3-diamine, hexamethylenediamine, diethylenetriamine, triethylenetetramine, 2,2,4-trimethylhexane-1,6-diamine, m-xylylenediamine, bis-(4-aminocyclohexyl)methane, 2,2-bis-(4-aminocyclohexyl)-propane and 3-aminomethyl-3,5,5-trimethylcyclohexylamine (isophoronediamine); polyaminoamides, for example those formed from aliphatic polyamines and dimerized or trimerized fatty acids; polyphenols, such as resorcinol, hydroquinone, 2,2-bis-(4-hydroxyphenyl)-propane (bisphenol A) and phenol/aldehyde resins; polythiols; polycarboxylic acids and anhydrides thereof, for example phthalic anhydride, tetrahydrophthalic anhydride, hexahydrophthalic anhydride, hexachloroendomethylenetetrahydrophthalic anhydride, pyromellitic dianhydride, benzophenone-3,3',4, 4'-tetracarboxylic dianhydride, the acids of the abovementioned anhydrides and also isophthalic acid and terephthalic acid.

The curing agent may have a catalytic action, examples of those having such action include tertiary amines, for example 2,4,6-tris-(dimethylaminoethyl)-phenol; imidazoles or Mannich bases; alkali metal alcoholates, for example the Na alcoholate of 2,4-dihydroxy-3-hydroxymethylpentane; tin salts of alkanoic acids, for example tin octanoate; Friedel-Crafts catalysts, such as boron trifluoride and boron trichloride and complexes and chelates thereof which are obtained by reacting boron trifluoride with, for example, 1,3-diketones; and amidines, preferably dicyandiamide.

Other examples include boron trichloride/amine and boron trifluoride/amine complexes, dicyandiamide, melamine, diallylmelamine, guanamines such as acetoguanamine and benzoguanamine, aminotriazoles such as 3-amino-1,2,4-triazole, hydrazides such as adipic dihydrazide, stearic dihydrazide, isophthalic dihydrazide, semicarbazide, cyanoacetamide, and aromatic polyamines such as diaminodiphenylsulphones. The use of dicyandiamide, isophthalic acid dihydrazide, adipic acid dihydrazide and 4,4'-diaminodiphenylsulphone is particularly preferred.

When used, the curing agent, is present in an amount sufficient to cure the composition, such as about 3 to about 15 parts per hundred parts of curable composition, for instance about 5 to about 10 parts per hundred parts of curable composition.

p-Chlorophenyl-N,N-dimethylurea (MONURON), 3-phenyl-1,1-dimethylurea (PHENURON), 3,4-dichlorophenyl-N, N-dimethylurea (DIURON), N-(3-chloro-4-methylphenyl)-N',N'-dimethylurea (CHLORTOLURON), tert-acryl- or alkylene amines like benzyldimethylamine, 2,4,6-tris(dimethylaminomethyl)phenol, piperidine or derivatives thereof, imidazole derivates, in general $C_{1-12}$ alkylene imidazole or N-arylimidazoles, such as 2-ethyl-2-methylimidazol, 6-caprolactam, a preferred catalyst is 2,4,6-tris(dimethylaminomethyl)phe-nol integrated into a poly(p-vinylphenol) matrix (as described in European Patent No. EP 0 197 892).

In general, the curing temperatures of the inventive compositions are between 80 and 250° C., such as between 100 and 180° C., for a period of time of about 30 minutes to 4 hours. Thus, the inventive compositions can be used at relatively moderate temperatures to achieve very good productivity. The curing can if desired be conducted in two stages, for example, by interrupting the curing process or, if a curing agent is employed for elevated temperatures, by allowing the curable composition to cure partially at lower temperatures. The products obtained thereby are called B-stage resins and are suitable, for example, for prepregging or towpregging applications, discussed in more detail below.

If desired, reactive diluents, for example styrene oxide, butyl glycidyl ether, 2,2,4-trimethylpentyl glycidyl ether, phenyl glycidyl ether, cresyl glycidyl ether or glycidyl esters of synthetic, highly branched, mainly tertiary, aliphatic monocarboxylic acids, may be added to the curable compositions to reduce their viscosity.

Other additives which the inventive compositions can include plasticizers, extenders, microspheres, reinforcing agents, for example coal tar, bitumen, textile fibres, glass fibres, asbestos fibres, boron fibres, carbon fibres, mineral silicates, mica, powdered quartz, hydrated aluminum oxide, bentonite, wollastonite, kaolin, silica, aerogel or metal powders, for example aluminium powder or iron powder, and also pigments and dyes, such as carbon black, oxide colors and titanium dioxide, fire-retarding agents, thixotropic agents, flow control agents, such as silicones, waxes and stearates, which can, in part, also be used as mold release agents, adhesion promoters, antioxidants and light stabilizers, the particle size and distribution of many of which may be controlled to vary the physical properties and performance of the inventive compositions.

As noted, the invention relates also to prepregs formed from a layer of fibers infused with the inventive curable composition.

In this regard, the invention relates to processes for producing a prepreg. One such process includes the steps of (a) providing a layer of fibers; (b) providing the inventive curable composition; and (c) joining the curable composition and the layer of fibers to form a prepreg assembly, and exposing the resulting prepreg assembly to elevated temperature and pressure conditions sufficient to infuse the layer of fibers with the curable composition to form a prepreg.

Another such process for producing a prepreg, includes the steps of (a) providing a layer of fibers; (b) providing the inventive curable composition in liquid form; (c) passing the layer of fibers through the liquid curable composition to infuse the layer of fibers with the curable composition; and (d) removing excess heat curable composition from the prepreg assembly.

The fiber layer may be constructed from unidirectional fibers, woven fibers, chopped fibers, non-woven fibers or long, discontinuous fibers.

The fiber chosen may be selected from carbon, glass, aramid, boron, polyalkylene, quartz, polybenzimidazole, polyetheretherketone, polyphenylene sulfide, poly p-phenylene benzobisoaxazole, silicon carbide, phenolformaldehyde, phthalate and napthenoate.

The carbon is selected from polyacrylonitrile, pitch and acrylic, and the glass is selected from S glass, S2 glass, E glass, R glass, A glass, AR glass, C glass, D glass, ECR glass, glass filament, staple glass, T glass and zirconium oxide glass.

The invention further relates to a towpreg formed from a bundle of such fibers infused with the inventive curable composition.

In this regard, the invention relates also to processes for producing a towpreg. In one such process, the steps include (a) providing a bundle of fibers; (b) providing the heat curable composition and (c) joining the curable composition and the bundle of fibers to form a towpreg assembly, and exposing the resulting towpreg assembly to elevated temperature and pressure conditions sufficient to impregnate the bundle of fibers with the curable composition to form a towpreg.

In another such process, the steps include a) providing a bundle of fibers; b) providing the inventive curable composition in liquid form; c) passing the bundle of fibers through the liquid curable composition to impregnate the bundle of fibers with the curable composition; and d) removing excess curable composition from the towpreg assembly, thereby forming the towpreg.

As noted, the invention relates also to preform formed from a layer of fibers infused with the inventive curable composition.

In this regard, the invention relates to processes for producing a preform. One such process includes the steps of (a) providing a layer of fibers; (b) providing the inventive curable composition; and (c) joining the curable composition and the layer of fibers to form a preform assembly, and exposing the resulting preform assembly to elevated temperature and pressure conditions sufficient to infuse the layer of fibers with the inventive curable composition to form a preform.

The inventive compositions (and pregregs, towpreg and preforms prepared therefrom) are particularly useful in the manufacture and assembly of composite parts for aerospace and industrial end uses, bonding of composite and metal parts, core and core-fill for sandwich structures and composite surfacing.

EXAMPLES

Example 1

Synthesis of Adducts

First Adduct

The first adduct was formed as follows:

Set up a reactor with a positive dry nitrogen gas supply, heating and cooling capability, stirring capability and temperature monitoring capability.

Add 50.00 parts of DER 332 epoxy resin to the reactor.

Add 42.86 parts TERATHANE 2000 polyether glycol to the reactor.

Heat the contents of the reactor to a temperature of 225° F. under a reduced pressure of greater than 28 inches of Hg vacuum, with mixing for a period of time of 60 minutes.

Turn off the vacuum source to the reactor and bleed dry nitrogen into the headspace of the reactor.

Cool the contents of the reactor to a temperature of 170° F.

While mixing, carefully add 0.0005 parts of 95% dibutyltin dilaurate catalyst.

Add 6.57 parts of MONDUR M (4,4' methylene disiocyanate).

Adjust the reactor mixing and temperature set points to maintain a temperature of 180° F. and maintain positive dry nitrogen flow.

Monitor the molecular weight increase of the first adduct which is forming using GPC.

When the molecular weight reaches 62,000, add 0.57 parts of p-aminophenol and continue mixing at a temperature of 180° F. with positive dry nitrogen flow.

Monitor the isocyanate content of the reactor mixture using IR until all isocyanate has been reacted.

Transfer the mixture of hydroxyl-terminated polyurethane prepolymer first adduct in epoxy resin to storage containers.

Second Adduct

The second adduct was formed as follows:

Set up a reactor with a heating and cooling capability, stirring capability and temperature monitoring capability.

Add 29.61 parts of EPON 826/BLENDEX 338 mixture (22.78 parts EPON 826 and 6.83 parts of BLENDEX 33B), 1.82 parts of EPON 828 and 8.89 parts of the first adduct into the reactor and mix at a temperature of 180° F.

Add 15.22 parts of bisphenol A, heat the contents of the reactor to a temperature of 230° F., mix until homogeneous and then cool to a temperature of 170° F.

Add 0.015 parts of triphenylphosphine ethyl iodide and heat the contents of the reactor to a temperature of 275° F. with mixing until the viscosity at a temperature of 250° F. shows a viscosity greater than 4,000 poise.

Add 27.78 parts of EPON 826/BLENDEX 338 mixture (21.37 parts EPON 826 and 6.41 parts of BLENDEX 338) and mix under a reduced pressure of greater than 25 inches Hg vacuum.

Add 10 parts EPON 828 and 6.67 parts of the first adduct and mix under a reduced pressure of greater than 25 inches of Hg vacuum.

Transfer the mixture of first and second adducts in epoxy resin to storage containers.

Example 2

Composition Formulation

In a first example, the following components were used to prepare Sample Nos. 1-5 as noted in Table 1.

TABLE 1

| | Sample No./ Amt.(wt.%) | | | | |
|---|---|---|---|---|---|
| Components | 1 | 2 | 3 | 4 | 5 |
| B-m type Benzoxazine | 90 | 85 | 78 | 75 | 65 |
| ATBN HYCAR 1300X16 | 10 | 15 | 14 | — | 10 |
| Cycloaliphatic Epoxy | — | — | 8 | 15 | 15 |
| NANOPOX F630* | — | — | — | 10 | 10 |

*Silica nanoparticle reinforced epoxy resins, commercially available from Nanoresins.

Each of the samples was prepared as follows:

The benzoxazine was warmed at a temperature in the range of 180-200° F. to render it flowable, without initiating curing.

Where the NANOPDX F630 silica nanoparticles were present, the flowable benzoxazine was mixed therewith at a temperature of 180° F. until a homogeneous mixture was formed.

Where ATBN was present, the ATBN was mixed into the mixture at a temperature in the range of 160-180° F.

The composition so formed was mixed under a vacuum, at a temperature in the range of 160-180° F. for a period of time of 15-30 minutes. The so formed composition was stored in a closed container at room temperature.

The samples noted in Table 1 may be cured in an open face mold placed in an autoclave using the following cure profile:

The samples were exposed to 90 psi pressure within the autoclave and the temperature therein was increased at a 5° F./min ramp rate to a temperature of 350° F., for a period of time of about 3 hours. The cured samples were then cooled to a temperature of about 90° F. in the mold at a 5° F./min ramp rate for a period of time of about 1 hour before use or evaluation.

The samples were cured and evaluated for property performance, results of which are shown below in Table 2.

TABLE 2

| | Sample No. | | | | |
|---|---|---|---|---|---|
| Physical Properties | 1 | 2 | 3 | 4 | 5 |
| ΔH, J/g | −173 | −168 | −337 | −308 | −292 |
| Cured density, g/cc | 1.10 | 1.09 | 1.11 | 1.19 | 1.19 |
| $T_g$, ° F. | 370 | 387 | 367 | 385 | 365 |
| Hot/Wet $T_g$, ° F. | 360 | 374 | 351 | 361 | 352 |
| Moisture uptake, % | 1.1 | 1.5 | 1.7 | 2.0 | 2.7 |
| Flexure modulus, msi | 0.54 | 0.49 | 0.44 | 0.83 | 0.58 |
| $K_{Ic}$, ksi-in$^{1/2}$ | 1.2 | 1.3 | 1.3 | 0.8 | 1.2 |

Uncured samples were evaluated by Differential Scanning Calorimetry ("DSC"), within a temperature range of 40-350° C., where the temperature range increased at a 20° C./min ramp rate, and from which ΔH was recorded.

The cured samples were evaluated using the following property tests:

Density was measured according to ASTM D 792, and cure shrinkage was then calculated.

Dynamic mechanical thermal analysis ("DMTA") was performed on cured samples using a double cantilever fixture. The cured samples were isothermally equilibrated at a temperature of 40° C. in an oven and the temperature was increased at a 5° C./min ramp rate to a temperature of 250° C. Tg values were obtained from this DMTA evaluation from onset G', storage shear modulus.

The cured samples were also subjected to boiling water for 3 days, and weight gain was recorded. Tg values were obtained from these samples using a DMTA evaluation.

Flexure modulus was determined in accordance with ASTM D 790, using cured samples with the following specimen dimensions: 0.125×0.5×4 in., span 2 in., test speed: 0.05 in./min. $K_{IC}$ was determined in accordance with ASTM D5045, single-edge-notch bending ("SENB"), using cured specimens with dimensions: 0.15×0.5×3 in., span 2 in., test speed 0.5 in/min.

The advantages of using silica nanoparticles, for example, NANOPDX F630, include increasing the modulus and improving toughness of the cured composition, without compromising Tg and Hot/Wet Tg. In addition, the use of silica nanoparticles (contrasted with larger silica particles) allows for the inclusion of such silica nanoparticles in the composition even after filtration processes (oftentimes used in connection with prepreg or RTM), which would otherwise trap such larger particles.

For compositions prepared with B-m type benzoxazines and ATBN, good toughness along with high Tg (dry and Hot/Wet) are observed. However, as the amount of ATBN is increased, the modulus was observed to decrease (see e.g. Sample Nos. 1 and 2). By the addition of silica nanoparticle reinforced epoxy resin, for example, NANOPDX F630, the modulus was improved without adversely impacting Tg. Therefore, by including a toughener, such as ATBN, together with silica nanoparticles, such as NANOPDX F630, a benzoxazine-containing heat curable composition may be prepared having good toughness, high Tg and by adjusting the amounts of the various components a modulus range from low to high. Low modulus compositions are desirable generally for adhesive applications, while high modulus compositions can meet specifications oftentimes called for in high performance materials like prepregs or towpregs.

In a second example, Sample Nos. 6-7 were formulated from the components listed and amounts noted in Table 3.

These samples were used to make carbon fiber reinforced laminates. The so-prepared laminates were cured in an autoclave for 2 hours at 365° F. with a 3° F./min heat-up (to the 365° F. temperature) and 100 psi.

TABLE 3

| | Sample No./Amt. (wt %) | |
|---|---|---|
| Components | 6 | 7 |
| Bisphenol F/thiodiphenol benzoxazine* | 68 | 65 |
| ATBN | 10 | 10 |
| Cycloaliphatic Epoxy | 22 | 15 |
| Silica Nanoparticles | — | 10 |

*available commercially from Vantico.

In Table 4 below, flexure modules has been reported for Sample Nos. 6-7. Sample No. 7 (with silica nanoparticles) was determined to have higher modulus.

TABLE 4

| Physical Property | Sample No. 6 | Sample No. 7 |
|---|---|---|
| Flexure modulus, msi | 0.50 | 0.62 |

The laminates were cut into 4×6 in. specimens, and impacted in accordance with Boeing test method BSS 7260 Type II (plate compression after impact). The impact energy was 270 in-lb. The damage area was determined by C-Scan.

A laminate made with Sample No. 6 was determined to have a large damage area of 2.5 in$^2$, while a laminate made with Sample No. 7 was determined to have a smaller damage area of 0.7 in$^2$. This indicated that the presence of silica nanoparticles helped to decrease the impact damage area which is critical to composite applications.

Next, Sample Nos. 8-11 were prepared using Bm-type benzoxazine and, where noted, ATBN and/or a silica nanoparticle inorganic filler.

TABLE 5

| Components | Sample No./Amt. (parts) | | | |
|---|---|---|---|---|
| | 8 | 9 | 10 | 11 |
| B-m type Benzoxazine | 85 | 70 | 65 | 75 |
| ATBN HYCAR 1300X16 | 15 | 30 | 10 | — |
| NANOPOX F630* | — | — | 25 | 25 |

*Silica nanoparticle reinforced epoxy resins, commercially available from Nanoresins.

The preparation process for each of Sample Nos. 8-11 was as described above (except for Sample Nos. 10-11, where silica nanoparticles were added and Sample Nos. 8-10, where ATBN was added) as was the cure profile.

Sample Nos. 8-11 were cured and evaluated for property performance, results of which are shown below in Table 6.

TABLE 6

| Physical Properties | Sample No. | | | |
|---|---|---|---|---|
| | 8 | 9 | 10 | 11 |
| ΔH, J/g | −168 | −100 | −283 | −45 |
| Cured density | 1.09 | 1.08 | 1.18 | 0.99 |
| $T_g$, ° C. | 197 | 204 | 199 | 232 |
| Hot/Wet $T_g$, ° C. | 190 | 208 | 186 | 232 |
| Moisture uptake | 1.5 | 1.1 | 2.5 | 2.2 |
| Flexure modulus, (msi) | 0.49 | 0.26 | 0.61 | 0.83 |

In comparing these results from Sample Nos. 8-11, it is clear that Tg increased with the addition of ATBN into the Bm-type benzoxazine. Also, fracture toughness in terms of $G_{IC}$ increased with increased amounts of ATBN. And, the comparison between Tg and Hot/Wet Tg of Sample Nos. 8-11 showed that there was not an appreciable difference in these values.

The advantages of using silica nanoparticles, for example, NANOPDX F630, allows for the inclusion of such silica nanoparticles in the composition even after filtration processes (used in prepreg or RTM), which would otherwise trap conventional silica particles, which are larger particles.

Compositions were formulated from the noted components in the amounts recited in Tables A and B below.

TABLE A

| Component | Sample/Amt. (Wt. %) | |
|---|---|---|
| | A | B |
| Benzoxazine XV | 100 | 80 |
| Bisphenol A Epoxy Resin | — | 7.8 |
| First Adduct | — | 0.66 |
| Second Adduct | — | 8.78 |
| BLENDEX | — | 2.64 |

TABLE B

| Component | Sample/Amt. (Wt. %) | |
|---|---|---|
| | C | D |
| Benzoxazine XV | 75 | 60 |
| Cycloaliphatic Epoxy Resin -- CY 179 | 25 | 20 |
| Bisphenol A Epoxy Resin | — | 4.68 |
| First Adduct | — | 0.4 |
| Second Adduct | — | 5.27 |
| BLENDEX | — | 1.58 |
| RADEL 105 SFP | — | 8 |

The constituents were added as follows:

The benzoxazine was warmed at a temperature in the range of 180-200° F. to render it flowable, without initiating curing.

The first adduct and second adduct were mixed with the benzoxazine.

The epoxy resin was mixed with the benzoxazine first and second adduct combination at a temperature of 180° F. until a homogeneous mixture was formed.

The toughener was mixed into the mixture at a temperature in the range of 160-180° F.

The composition so formed was mixed under a vacuum, at a temperature in the range of 160-180° F. for a period of time of 15-30 minutes. The so formed composition was stored in a closed container at room temperature.

The samples noted may be cured in an open face mold placed in an autoclave using the following cure profile.

The samples were exposed to 90 psi pressure within the autoclave and the temperature therein was increased at a 5° F./rain ramp rate to a temperature of 350° F., for a period of time of about 3 hours. The cured samples were then cooled to a temperature of about 90° F. in the mold at a 5° F./min ramp rate for a period of time of about 1 hour before use or evaluation.

The cured samples were evaluated using the following property tests.

Dynamic mechanical thermal analysis ("DMTA") was performed on cured samples using a double cantilever fixture. The cured samples were isothermally equilibrated at a temperature of 40° C. in an oven and the temperature was increased at a 5° C./min ramp rate to a temperature of 250° C. Tg values were obtained from this DMTA evaluation from onset G', storage shear modulus.

The cured samples were also subjected to boiling water for 3 days, and weight gain was recorded. Tg values were obtained from these samples using a DMTA evaluation.

Density of uncured and cured samples was measured according to ASTM D 792.

Flexure strength and modulus were determined in accordance with ASTM D 790, using cured samples with the following specimen dimensions: 0.125×0.5×4 in., span 2 in., test speed: 0.05 in./min.

$K_{IC}$ and $G_{IC}$ was determined in accordance with ASTM D5045-96, using single edge notch bending ("SENB") specimens of the cured samples.

The results of these evaluations are set forth in Tables A and B.

TABLE C

| Properties | Sample A | Sample B |
|---|---|---|
| DMTA -- Tg (E'), ° C. Dry | 180 | 194 |
| DMTA -- Tg (E'), ° C. Wet | 163 | 165 |
| Moisture uptake, % | 1.12 | 1.32 |
| Tensile Strain, % | 1.00 | 2.07 |
| Tensile Strength, (ksi) | 6.05 | 9.95 |
| Tensile Modulus, (msi) | 0.61 | 0.57 |

TABLE D

| Properties | Sample A | Sample B |
|---|---|---|
| Cured density (g/cc) | 1.22 | 1.21 |
| $T_g$, ° C. | 201 | 206 |
| Hot/Wet $T_g$, ° C. | 167 | 172 |
| Moisture uptake % | 2.2 | 2.4 |
| Flexure strength (ksi) | 18 | 21 |
| Flexure modulus (msi) | 0.68 | 0.57 |
| Tensile Strength, (ksi) | 7 | 9 |
| Tensile Modulus, (msi) | 0.68 | 0.52 |
| Tensile Strain, % | 1.0 | 2.1 |
| $G_{IC}$, in-lb/in$^2$ | 1.9 | 2.1 |

The addition of the adducts described herein increases the toughness, measured by neat resin elongation, neat resin $G_{IC}$ fracture toughness and compression after impact ("CAI"). The resulting combination of toughness, Tg and modulus is better than state-of-the-art structural epoxies. This feature is believed to benefit prepreg performance, matrix resins for advanced processes, binder/tackifier applications and adhesive applications.

For instance, Samples C and D were used as matrix resins with carbon fiber of intermediate modulus to form prepreg composites, as shown in Table E.

TABLE E

| Properties | Sample C | Sample D |
|---|---|---|
| $T_g$, onset ° C. | 190 | 198 |
| OHC* (ksi) | — | 40-43 |
| CAI (ksi) | 31-33 | 36-43 |

*open hole compression

Here, nanosilica reinforcement is illustrated using NANOPDX F630 available commercially from Nanoresins. Table F below shows Samples E and F, with and without the nanosilica reinforcement, respectively.

TABLE F

| Component | Sample/Amt. (Wt. %) E | F |
|---|---|---|
| Benzoxazine XV | — | 8 |
| Benzoxazine XIX(R = $CH_3$ and $R^4$ = H) | 60 | 43 |

TABLE F-continued

| Component | Sample/Amt. (Wt. %) E | F |
|---|---|---|
| Cycloaliphatic Epoxy Resin -- CY 179 | 20 | 5 |
| Bisphenol A Epoxy Resin | 4.68 | 4.68 |
| First Adduct | 0.4 | 0.4 |
| Second Adduct | 5.27 | 5.27 |
| BLENDEX | 1.58 | 1.58 |
| RADEL 105 SFP | 8 | 16 |
| NANOPDX F630 | — | 16 |

Table G below shows physical property performance of Samples E and F.

TABLE G

| Properties | Sample E | Sample F |
|---|---|---|
| Cured density (g/cc) | 1.21 | — |
| $T_g$, ° C. | 206 | 200 |
| Hot/Wet $T_g$, ° C. | 172 | 166 |
| Moisture uptake % | 2.4 | 2.6 |
| Flexure strength (ksi) | 21 | 19 |
| Flexure modulus (msi) | 0.57 | 0.56 |
| Tensile Strength, (ksi) | 9 | 8 |
| Tensile Modulus, (msi) | 0.52 | 0.58 |
| Tensile Strain, % | 2.1 | 1.4 |
| $G_{IC}$, in-lb/in$^2$ | 2.1 | 2.0 |

The addition of the nanosilica reinforcement together with the adducts described herein increases the toughness, measured by neat resin elongation, neat resin $G_{IC}$ fracture toughness and compression after impact ("CAI"). The resulting combination of toughness, Tg and modulus is better than state-of-the-art structural epoxies. These features are believed to benefit prepreg performance, matrix resins for advanced processes, binder/tackifier applications and adhesive applications.

For instance, Samples E and F were used as matrix resins with carbon fiber of intermediate modulus to form prepreg composites, as shown in Table H.

TABLE H

| Properties | Sample E | Sample F |
|---|---|---|
| Tg, onset, ° C. Dry | 198 | 191 |
| Tg, onset, ° C. Wet | 164 | 161 |
| OHC, ksi | 40-43 | 42 |
| CAI, ksi | 36-43 | 36 |
| IPS-strength, ksi | — | 10 |
| IPS-modulus, ksi | — | 0.72 |
| 0° Tensile-Strength, ksi | — | 282 |
| 0° Tensile-Modulus, (msi) | — | 20.2 |
| 90° Tensile-Strength, ksi | — | 7.8 |
| 0° Compression-Strength, ksi | — | 208 |
| 0° ILSS-Strength, ksi (RT) | — | 13 |
| 0° ILSS-Strength, ksi (120° C.) | — | 10 |

The inventive curable composition is useful with the inclusion of continuous fiber (such as carbon fiber) in the prepreg or towpreg context and/or with fiber or fabric plies in the preform context, such that when cured the product demonstrates at least one of the following properties (normalized to 60% fiber volume fraction):

(i) tested using 24 ply quasi-isotropic laminate [+45, 0, −45, 90]3s, CAI of at least 30 ksi {210 Mpa} at 270 in-lbs (30 Joules) impact, such as at least about 35 ksi {240 Mpa} making it useful as a primary structure in an aircraft. CAI is an important physical property, particularly for aircraft structures, which are frequently impacted by tools and equipment during normal use. In addition, high CAI protects laminates from catastrophic failure during normal operations.

(ii) tested using 16 ply quasi-isotropic laminate [+45, 0, −45, 90]2s, open hole compression of at least 30 ksi, such as at least about 35 ksi {240 Mpa} making it useful as a primary structure in an aircraft. Open hole compression is an important physical property, particularly for aircraft structures, which require attachments to tie individual parts together. These attachments frequently use bolts or other fastening/assembling equipment. High compression of laminates containing holes protects laminates in use in aircraft structures from failure during flight.

(iii) tested using 16 ply quasi-isotropic laminate [+45, 0, −45, 90]2s, fire heat release HRR less than 65 kW/m$^2$ and HR of less than 65 kW*min/m$^2$, smoke density less than 100, toxic material release performance of less than 1000 ppm for CO, less than 150 ppm for each HCN and HCl and less than 100 ppm for each HF, nitrogen oxides (NOx) and sulfur (SO$_2$+H$_2$S). Here, reaching the levels recited, impacts favorably passenger and crew safety. More specifically, heat released, visibility and toxic chemical release during laminate burn affects passenger capability to evacuate safely during accidents.

(iv) Hot/Wet Tg of at least 140° C., as tested by Dynamic Mechanical Thermal Analyzer ("DMTA"). Aircraft on tarmacs during hot days experience moderate temperatures and structures near aircraft engines experience high temperatures; high Tg for laminates that are saturated with water after exposure to high humidity environment protects laminates from failure under hot and humid conditions; and (v) tested using 6 ply laminate [0]6, elongation of 1.5% to 6%. Higher laminate elongations result in higher laminate performance with higher CAI and lower damage area in the laminate after impact.

What is claimed is:

1. A curable composition comprising:

A) a benzoxazine component,

B) a combination of adducts one of which is prepared from hydroxy-containing compounds, isocyanate-containing compounds and a first phenolic compound and the second of which is prepared from the first adduct, an epoxy-containing compound and a second phenolic compound, C) an epoxy resin component, D) a polyether sulfone toughener comprising the structure:

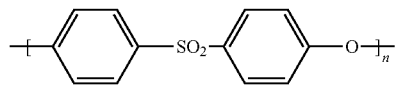

and

E) a silica having a particle size in the range of 1 to 1,000 nm.

2. A composition according to claim 1, wherein the benzoxazine component comprises one or more of

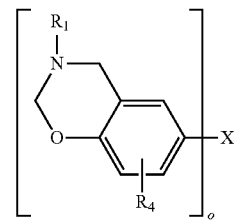

wherein o is 1-4, X is selected from the group consisting of the group consisting of a direct bond (when o is 2), alkyl (when o is 1), alkylene (when o is 2-4), carbonyl (when o is 2), thiol (when o is 1), thioether (when o is 2), sulfoxide (when o is 2), and sulfone (when o is 2), $R_1$ is selected from the group consisting of hydrogen, alkyl, and aryl, and $R_4$ is selected from hydrogen, halogen, alkyl, and alkenyl, or

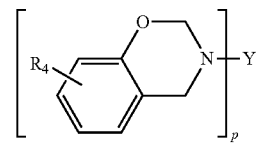

wherein p is 2, Y is selected from the group consisting of biphenyl (when p is 2), diphenyl methane (when p is 2), diphenyl isopropane (when p is 2), diphenyl sulfide (when p is 2), diphenyl sulfoxide (when p is 2), diphenyl sulfone (when p is 2), and diphenyl ketone (when p is 2), and $R_4$ is selected from the group consisting of hydrogen, halogen, alkyl and alkenyl.

3. A composition according to claim 1, wherein the benzoxazine component comprises one or more of

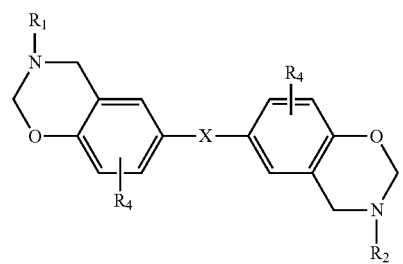

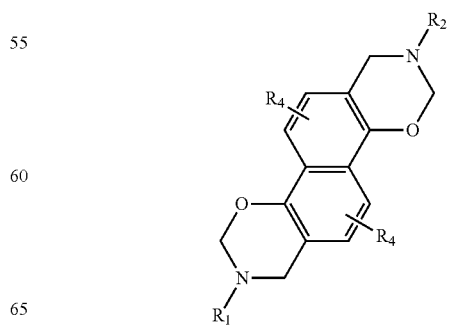

-continued
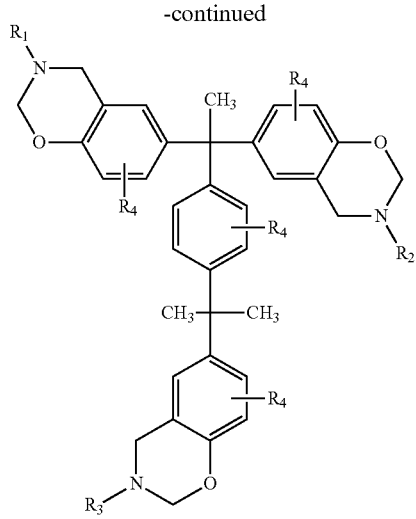
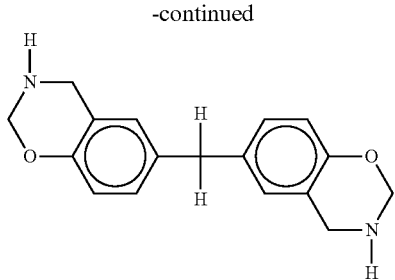
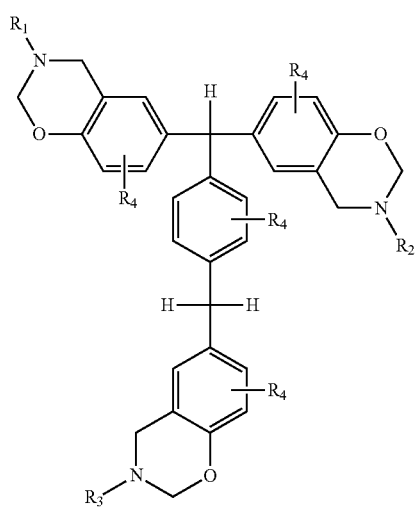
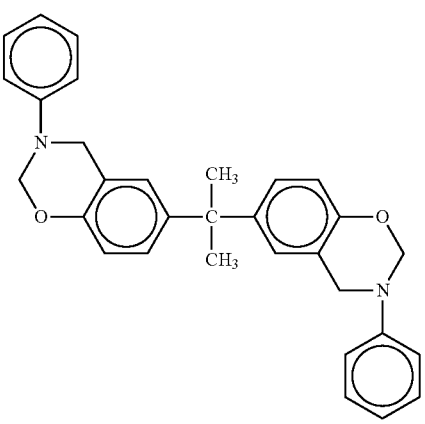
wherein X is selected from the group consisting of a direct bond, $CH_2$, $C(CH_3)_2$, C=O, S, S=O and O=S=O, and $R_1$, $R_2$, and $R_3$ are the same or different and alkyl, and $R_4$ is selected from the group consisting of a hydrogen, alkyl, alkenyl and aryl.
4. A composition according to claim 1, wherein the benzoxazine component comprises one or more of
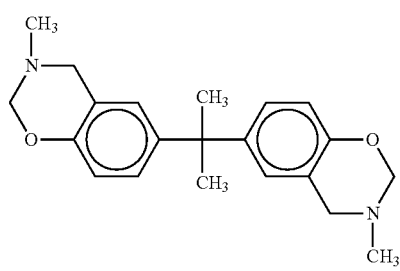
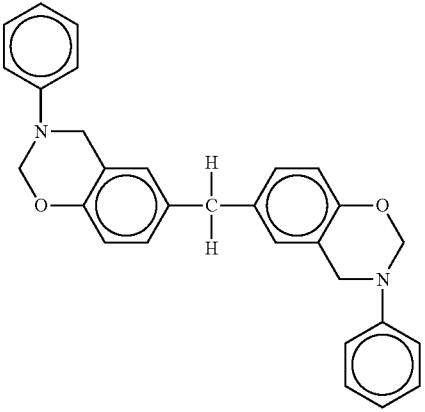
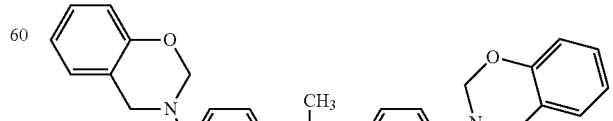
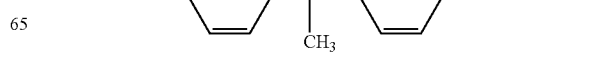

-continued

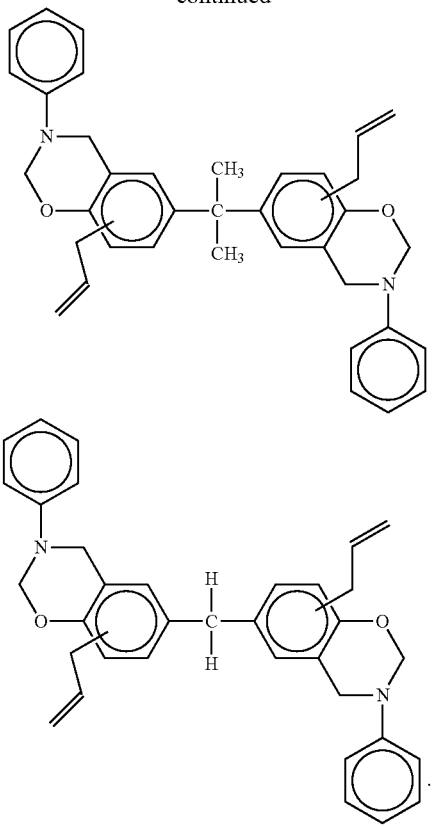

5. A composition according to claim 1, wherein the benzoxazine component is present in an amount in the range of about 10 to about 99 percent by weight, based on the total weight of the composition.

6. A composition according to claim 1, wherein the first adduct is prepared from hydroxy-containing compounds, isocyanate-containing compounds and phenolic compounds.

7. A composition according to claim 1, wherein the second adduct is prepared from the first adduct and epoxy-containing compounds and phenolic compounds.

8. A composition according to claim 1, wherein the epoxy resin component is a member selected from the group consisting of $C_1$-$C_{28}$ alkyl-, poly-phenol glycidyl ethers; polyglycidyl ethers of pyrocatechol, resorcinol, hydroquinone, 4,4'-dihydroxydiphenyl methane, 4,4'-dihydroxy-3,3'-dimethyldiphenyl methane, 4,4'-dihydroxydiphenyl dimethyl methane, 4,4'-dihydroxydiphenyl methyl methane, 4,4'-dihydroxydiphenyl cyclohexane, 4,4'-dihydroxy-3,3'-dimethyldiphenyl propane, 4,4'-dihydroxydiphenyl sulfone, and tris (4-hydroxyphyenyl)methane; polyglycidyl ethers of transition metal complexes; chlorination and bromination products of the above-mentioned diphenols; polyglycidyl ethers of novolacs; polyglycidyl ethers of diphenols obtained by esterifying ethers of diphenols obtained by esterifying salts of an aromatic hydrocarboxylic acid with a dihaloalkane or dihalogen dialkyl ether; polyglycidyl ethers of polyphenols obtained by condensing phenols and long-chain halogen paraffins containing at least two halogen atoms; phenol novolac epoxy; cresol novolac epoxy; and combinations thereof.

9. A prepreg comprising a layer of fibers infused with the composition of claim 1.

10. Cured reaction products of the prepreg according to claim 9.

11. A process for producing a prepreg, steps of which comprise:
A) providing a layer of fibers;
B) providing the composition according to claim 1; and
C) joining the composition and the layer of fibers to form a prepreg assembly, and exposing the resulting prepreg assembly to elevated temperature and pressure conditions sufficient to infuse the layer of fibers with the heat curable composition to form a prepreg.

12. A process for producing a prepreg, steps of which comprise:
A) providing a layer of fibers;
B) providing the composition according to claim 1 in liquid form;
C) passing the layer of fibers through the liquid heat curable composition to infuse the layer of fibers with the heat curable composition; and
D) removing excess heat curable composition from the prepreg assembly.

13. A prepreg made by the process according to claim 11.

14. A prepreg made by the process according to claim 12.

15. A towpreg comprising:
A) a bundle of fibers infused with the composition according to claim 1.

16. Cured reaction products of the towpreg according to claim 15.

17. A process for producing a towpreg, steps of which comprise:
A) providing a bundle of fibers;
B) providing the composition according to claim 1; and
C) joining the heat curable composition and the bundle of fibers to form a towpreg assembly, and exposing the resulting towpreg assembly to elevated temperature and pressure conditions sufficient to impregnate the bundle of fibers with the heat curable composition to form a towpreg.

18. A process for producing a towpreg, steps of which comprise:
A) providing a bundle of fibers;
B) providing the composition according to claim 1 in liquid form;
C) passing the bundle of fibers through the liquid heat curable composition to impregnate the bundle of fibers with the heat curable composition; and
D) removing excess heat curable composition from the towpreg assembly, thereby forming a towpreg.

19. A towpreg made by the process according to claim 17.

20. A towpreg made by the process according to claim 18.

21. An adhesive composition comprising the composition according to claim 1.

22. Cured reaction product of the adhesive composition according to claim 21.

23. An adhesive film according to claim 21, further comprising a support selected from the group consisting of nylon, glass, carbon, polyester, polyalkylene, quartz, polybenzimidazole, polyetheretherketone, polyphenylene sulfide, poly p-phenylene benzobisoaxazole, silicon carbide, phenolformaldehyde, phthalate and napthenoate.

24. A prepreg or towpreg made from
A. a matrix resin composition comprising:
(a) a benzoxazine component;
(b) a component reactive with the benzoxazine component;
(c) a silica component having a mean particle diameter on the order of $10^{-9}$ meters;

(d) a thermoplastic particle component;
(e) a toughening adduct; and
(f) optionally, a curative or catalyst; and B. (a) continuous fiber or fabric, wherein the prepreg or towpreg when cured demonstrates at least one of the following properties (normalized to 60% fiber volume fraction):
   (i) compression after impact of at least 30 ksi {210 Mpa} at 270 in-lbs (30 Joules) impact;
   (ii) open hole compression of at least 30 ksi {210 Mpa};
   (iii) fire heat release HRR less than 65 kW/m$^2$ and HR of less than 65 kW*min/m$^2$, smoke density less than 100, toxic material release performance of less than 1000 ppm for CO, less than 150 ppm for each HCN and HCl and less than 100 ppm for each HF, nitrogen oxides and sulfur; and
   (iv) Hot/Wet Tg of at least 140° C.

25. The prepreg or towpreg of claim 24, wherein at least a portion of the thermoplastic particle component is disposed at one or more surfaces of the prepreg or towpreg that are available for mating with another substrate.

26. The prepreg or towpreg of claim 24, wherein the thermoplastic particle component comprises a toughener functionalized with a group reactive with the benzoxazine component and/or the component reactive with the benzoxazine component.

27. The prepreg or towpreg of claim 24, wherein the matrix resin composition comprises a benzoxazine component present in an amount between 30% to 80% by weight.

28. The prepreg or towpreg of claim 24, wherein the component reactive with the benzoxazine component is a member selected from the group consisting of epoxy, episulfide, oxetane, and cyanate ester.

29. The prepreg or towpreg of claim 24, wherein the silica component is a silica nanoparticle reinforced epoxy resin component, wherein said epoxy resin is selected from the group consisting of a cycloaliphatic epoxy resin matrix, a bishpenol A epoxy resin matrix, and a bisphenol F epoxy resin matrix; wherein the silica nanoparticle reinforced epoxy resin component is present in an amount of from 3 to 30% by weight of the total composition.

30. The prepreg or towpreg of claim 24, wherein the matrix resin composition comprises a toughening adduct in an amount between 5 to 25% by weight.

31. The prepreg or towpreg of claim 24, wherein the toughening adduct comprises a combination of adducts one of which is prepared from hydroxy-containing compounds, isocyanate-containing compounds and a first phenolic compound and a second of which is prepared from the first adduct, an epoxy-containing compound and a second phenolic compound.

32. The prepreg or towpreg of claim 24, wherein the fiber is selected from the group consisting of carbon fiber, glass fiber and aramid fiber.

33. A laminate made from the prepreg or towpreg of claim 24.

34. The prepreg or towpreg of claim 24, for use as a primary structure and having compression after impact of at least about 35 ksi {240 Mpa} and open hole compression of at least about 35 ksi {240 Mpa}.

35. A resin film infused preform comprising:
   A. a matrix resin composition comprising:
      (a) a benzoxazine component;
      (b) a component reactive with the benzoxazine component;
      (c) a silica component having a mean particle diameter on the order of 10$^{-9}$ meters;
      (d) a thermoplastic particle component;
      (e) a toughening adduct; and
      (f) optionally, a curative or catalyst; and
   B. (a) a plurality of fiber or fabric plies, wherein the resin film infused preform when cured demonstrates at least one of the following properties (normalized to 60% fiber volume fraction):
   (i) compression after impact of at least 27 ksi {190 Mpa} at 270 in-lbs (30 Joules) impact;
   (ii) open hole compression of at least 30 ksi {210 Mpa};
   (iii) fire heat release HRR less than 65 kW/m$^2$ and HR of less than 65 kW*min/m$^2$, smoke density less than 100, toxic material release performance of less than 1000 ppm for CO, less than 150 ppm for each HCN and HCl and less than 100 ppm for each HF, nitrogen oxides and sulfur; and
   (iv) Hot/Wet Tg of at least 140° C.

36. A preform for a resin transfer molding process made from a matrix resin composition comprising:
   (a) a benzoxazine component;
   (b) a binder comprising a component reactive with the benzoxazine component;
   (c) optionally, a silica component having a mean particle diameter on the order of 10$^{-9}$ meters;
   (d) a thermoplastic particle component;
   (e) a toughening adduct;
   (f) optionally, a curative or catalyst; and
   (g) carbon fiber, wherein when cured the product of the resin transfer molding process demonstrates at least one of the following properties (normalized to 60% fiber volume fraction):
   (i) compression after impact of at least 30 ksi {210 Mpa} at 270 in-lbs (30 Joules) impact;
   (ii) open hole compression of at least 30 ksi;
   (iii) fire heat release HRR less than 65 kW/m$^2$ and HR of less than 65 kW*min/m$^2$, smoke density less than 100, toxic material release performance of less than 1000 ppm for CO, less than 150 ppm for each HCN and HCl and less than 100 ppm for each HF, nitrogen oxides and sulfur;
   (iv) Hot/Wet Tg of at least 140° C.; and
   (v) elongation of 1.5% to 6%.

* * * * *